US008556836B2

(12) United States Patent
Menga

(10) Patent No.: US 8,556,836 B2
(45) Date of Patent: Oct. 15, 2013

(54) SYSTEM FOR CONTROLLING AN EXOSKELETON HAPTIC DEVICE FOR REHABILITATION PURPOSES, AND CORRESPONDING EXOSKELETON HAPTIC DEVICE

(75) Inventor: Giuseppe Menga, Villarbasse (IT)

(73) Assignee: Syco di Hedvig Haberl & C.S.A.S., Turin (IT)

( * ) Notice: Subject to any disclaimer, the term of this patent is extended or adjusted under 35 U.S.C. 154(b) by 343 days.

(21) Appl. No.: 12/756,013

(22) Filed: Apr. 7, 2010

(65) Prior Publication Data

US 2010/0256537 A1 Oct. 7, 2010

(30) Foreign Application Priority Data

Apr. 7, 2009 (EP) .................................. 09425130

(51) Int. Cl.
*A61H 1/00* (2006.01)
(52) U.S. Cl.
USPC ...................... 601/35; 601/5; 601/23; 601/34
(58) Field of Classification Search
USPC ........ 901/2, 19, 20, 45, 50; 700/245–264, 45, 700/69; 601/5, 23, 26, 27, 29, 31, 32, 34, 601/35, 36; 482/52, 70
See application file for complete search history.

(56) References Cited

U.S. PATENT DOCUMENTS

| 5,112,296 | A | 5/1992 | Beard et al. | |
|---|---|---|---|---|
| 7,190,141 | B1 | 3/2007 | Ashrafiuon et al. | |
| 2004/0254771 | A1* | 12/2004 | Riener et al. | 703/7 |
| 2005/0267630 | A1 | 12/2005 | Kajita et al. | |

FOREIGN PATENT DOCUMENTS

| EP | 1 723 941 A1 | 11/2006 |
|---|---|---|
| JP | 2004188531 | 7/2004 |
| WO | WO 2004/096502 A1 | 11/2004 |

OTHER PUBLICATIONS

"Power Assist Control for Walking Aid with HAL-3 based on EMG and Impedance Adjustment around Knee Joint" IEEE Proceedings of the 2002 IEEE/RSJ International Conference on Intelligent Robots and Systems. Lee et al.*
"Wearable Robots: Biomechatronic Exoskeletons" Copyright 2008 Jose L. Pons Editor.*
European Search Report from EP 09 42 5130, dated Mar. 8, 2010, 2 pages.
Kawamoto et al., "Comfortable Power Assist Control Method for Walking Aid by HAL-3," *The 12th IEEE International Workshop on Robot and Human Interactive Communication*, Oct. 31-Nov. 2, 2003, 6 pages.

* cited by examiner

*Primary Examiner* — Elizabeth Houston
*Assistant Examiner* — Mark Wardas
(74) *Attorney, Agent, or Firm* — Klarquist Sparkman, LLP

(57) ABSTRACT

Disclosed herein is a control system for an exoskeleton haptic device, having: a frame structure, to be coupled to the body of a subject; actuators, carried by the frame structure and operable to cause movement of a number of joints of the body; and sensors, coupled to the body to detect first signals indicative of an intention of movement of the subject. The control system is provided with: a feedback stage, controlling a position of the joints based on a reference position; a feedforward stage, controlling a compliance presented by the exoskeleton haptic device to the subject based on the detected first signals; and a combining block, combining outputs from the feedback stage and feedforward stage in order to generate a driving signal for the actuators, thereby imposing a controlled position to the joints. This primary control action may also be integrated with a posture equilibrium control, for controlling postural equilibrium of the subject during the movement.

15 Claims, 18 Drawing Sheets

SYSTEM FOR CONTROLLING AN EXOSKELETON HAPTIC DEVICE FOR REHABILITATION PURPOSES, AND CORRESPONDING EXOSKELETON HAPTIC DEVICE

CROSS REFERENCE TO RELATED APPLICATIONS

This application claims priority from European Patent Application No. 09425130.3, filed Apr. 7, 2009, which is incorporated herein by reference in its entirety.

TECHNICAL FIELD

The present invention relates in general to a system for controlling an exoskeleton haptic device for rehabilitation purposes, in particular for use in lower limb rehabilitation, to which the following treatment will make specific reference without however this implying any loss of generality.

BACKGROUND

As is known, rehabilitation is an important practice to assist an infirm patient to recover full or partial neuromuscular or muscular control of a part of the body, limb or organ, such as the arms or legs and related joints, such as hips, knees, elbow, etc. It has long been shown that, even in patients who have lost the ability to autonomously perform movements, the execution of assisted movements of the part of the body to be rehabilitated allows to recover first a neural control and then a muscular control on that part of the body. For example, rehabilitation of the lower limbs is required for recovery of patients with post-stroke injuries or parkinsonian syndromes, in order to regain or improve posture control and postural equilibrium.

Rehabilitation requires in general execution of a number of repetitive physical exercises involving the affected limb, and assistance to the patient is needed during execution of these exercises, particularly at the early stages of rehabilitation (when the patient has little control of the affected part of the body). Assistance to the patient is often provided manually by one or more therapists, but it is not always possible to perform all the required exercises with the correct procedure.

Accordingly, rehabilitation systems and apparatuses have been designed, in the form of more or less complex harnesses, for example adapted to be placed hanging from the ceiling, that allow to support the weight of the patient and thus help the same patient in the execution of the rehabilitation exercises. However, these apparatuses are complex and expensive and offer a limited amount of flexibility and modularity in adapting to the specific needs of the various patients, and, even more importantly, do not involve neurologically, as well as physically the patient.

Recently, designing of exoskeleton devices has been proposed as a promising solution for assisting patients during rehabilitation treatments. Exoskeleton devices, including supporting frames of motorized segments to be applied to the patient, have indeed the potentiality to offer a versatile solution to be used by the patient in the execution of the different repetitive rehabilitation exercises. However, designing of such exoskeleton devices poses a serious challenge in terms of their control logic, and reliable exoskeleton devices for rehabilitation have not yet been designed and are still not currently available.

Indeed, research in the field of exoskeleton devices has been focused mainly on strength augmentation in order to boost the performances of the wearer, for example for military or heavy work applications. These devices do not address the problem of providing patient support and postural stability, since they imply the presence of an able-bodied wearer.

In spite of many results in the field of postural equilibrium of biped robotics, fewer studies in the field of rehabilitation have tackled the joint aspects of postural stability (instead of strength) augmentation and patient compliance, and the few exoskeletons proposed have shown evident limitations and failed to address all the requirements and needs for patient recovery, among which: an accurate position control, in order to maintain the exoskeleton (and wearer) dynamically stable or constrain it to follow a planned reference trajectory; a controlled patient "compliance" (i.e. the capability to control the resistance perceived by the patient to voluntary movements), in order to involve the patient in the rehabilitation exercises and tutoring the improvements in the patient abilities; and, either whenever dynamical exercises are performed or quiet standing is maintained, a controlled postural equilibrium, in order to interact with the patient for maintaining or timely regaining equilibrium and correcting any erroneous patient posture. In particular, the control systems that have been proposed for the known exoskeletons have not proven sufficiently robust and reliable to accommodate all the above requirements.

SUMMARY

The aim of the present invention is thus to provide an improved exoskeleton device control system and a related exoskeleton device, overcoming the limitations of known exoskeleton devices for rehabilitation purposes and allowing the various and different requirements and needs of a rehabilitation treatment to be satisfied.

This aim is achieved by the present invention in that it relates to a system for controlling an exoskeleton haptic device for rehabilitation purposes, and to a related exoskeleton haptic device, as defined in the attached claims.

BRIEF DESCRIPTION OF THE DRAWINGS

For a better understanding of the present invention, preferred embodiments, which are intended purely by way of example and are not to be construed as limiting, will now be described with reference to the attached drawings, wherein.

DETAILED DESCRIPTION

In the following discussion, the expression "number of mechanical degree of freedoms" will be used to denote the number of independent generalized coordinates in a multi-body system; with the expression "two degree of freedom control" it will be referred to a closed loop control where both disturbance insensitivity and reference signal tracking characteristics for the outputs are independently specified and achieved; the expression "mechanical impedance" will refer to the linear transfer function between reaction forces/torques returned by a mechanical system by imposing velocities/angular velocities; and the expression "mechanical admittance" will be used to denote the inverse of the mechanical impedance.

Figure 1:
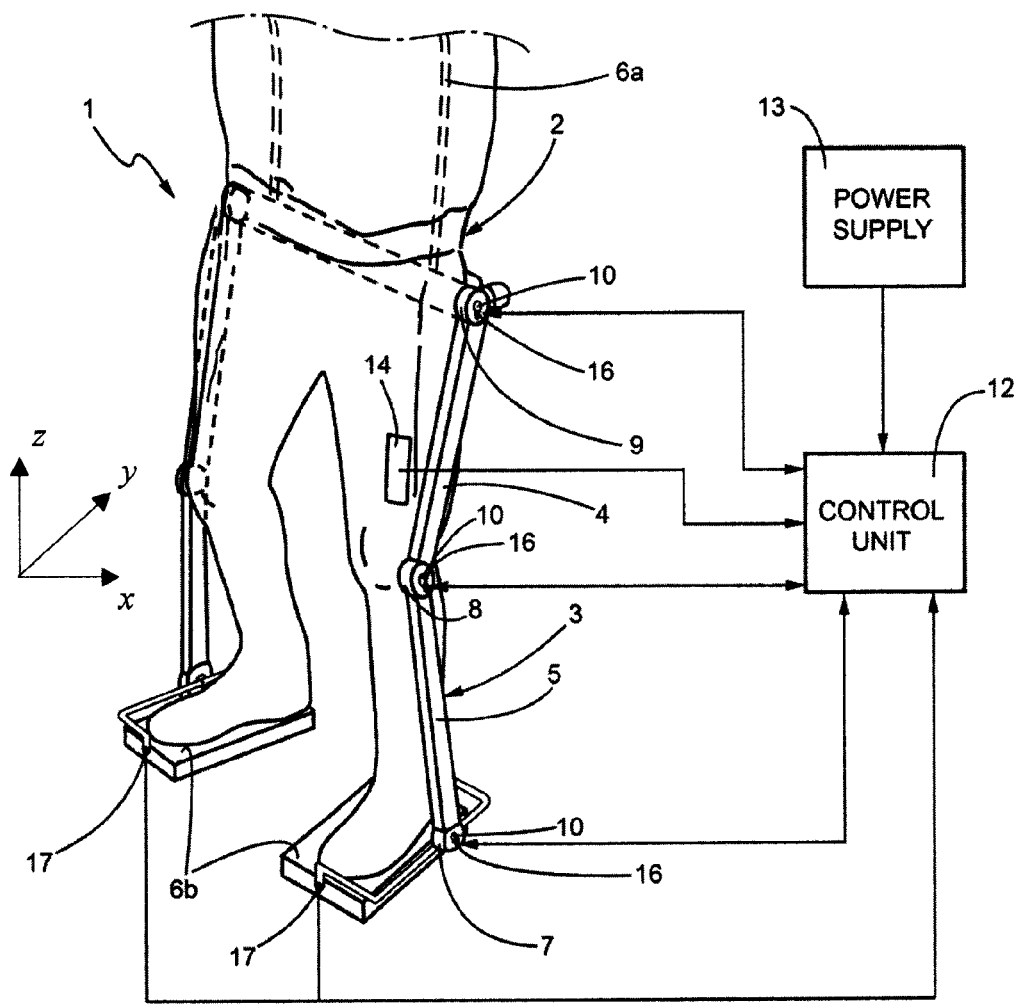
FIG. 1 is a schematic representation of an exoskeleton haptic device and of a related control system, according to an embodiment of the invention.

As shown in FIG. 1, an embodiment of the present invention provides an exoskeleton haptic device 1, designed for rehabilitation of the lower limbs.

The exoskeleton haptic device 1 is adapted to be worn by a patient 2 undergoing a rehabilitation treatment and comprises a frame structure 3 (shown schematically) to be coupled to the trunk and lower limbs of the patient 2 (FIG. 1 shows only the part to be coupled to the right leg of the patient, but an altogether similar part is intended to be coupled to the left leg of the patient).

The frame structure 3 includes: an upper arm 4, coupled to the thigh of the patient 2 and extending substantially parallel to the femur; a lower arm 5 coupled to the leg of the patient and extending substantially parallel to the tibia; and a back support element 6a coupled to the trunk of the patient 2. The lower arm 5 is coupled to a foot rest 6b, supporting the foot and sole of the patient, via an ankle joint 7 and to the upper arm 4 via a knee joint 8; the upper arm 4 ends at a hip joint 9, connected to the back support of the trunk. The ankle, knee and hip joints 7, 8, 9 allow the relative movement between the foot rest 6b, lower arm 5, upper arm 4 and back support; in particular the ankle and hip joints 7, 9 have two degrees of freedom, for rotations in the sagittal and frontal plane, while the knee joint 8 has a single degree of freedom, for rotation in the sagittal plane. Actuators, e.g. electric motors 10, are coupled to each one of the ankle, knee and hip joints 7, 8, 9, and are operable to control their movements in the sagittal plane; electric motors 10 on either left and right hips are also operable to control movements in the frontal plane (as will be described in more details in the following).

A control unit 12 is coupled to the exoskeleton haptic device 1 and implements a control algorithm for driving the electric motors 10 at the various joints, thus controlling the exoskeleton movement. Preferably, the control unit is implemented by a processing unit (such as a microprocessor, a DSP unit, or a similar unit provided with processing and computing capabilities), executing a suitable set of software instructions.

The control unit 12 is supplied by a suitable power supply unit 13 (e.g. including rechargeable batteries) and receives at its input: bioelectrical signals, in particular EMG (Electromyographic) signals (more specifically surface EMG signal, i.e. detected on the skin surface), indicative of the patient intention and strength of movement, from bioelectric sensors 14 coupled to the patient lower limbs and placed on the muscles involved in lower limb movement (in FIG. 1, for reasons of simplicity of depiction only a sensor is shown, placed on the thigh); position and velocity signals from position/velocity sensors 16, for detection of angles of the ankle, knee and hip joints 7, 8, 9; reaction force sensors 17, positioned on the exoskeleton foot rests 6b and configured to detect the reaction forces imparted by the ground and the center of these reaction forces; and, during single stance, the coordinate of the free foot derived from the kinematics that links the foot rest 6b to the ground.

Control unit 12 processes the input signals and, based on the implemented control algorithm, outputs suitable driving commands for the electric motors 10, in particular indicative of the torque that is to be applied to the ankle, knee and hip joints 7, 8, 9.

Advantageously, the control unit 12 and power supply 13 are designed to be light-weight and to be carried by the patient; for example, suitable electronics circuitry implementing the control unit 12 is housed in a belt around the waist of the patient.

However, in a first embodiment of the present invention, the exoskeleton haptic device 1 is a substantially stationary exoskeleton not intended for walking exercises, as the feet are connected to the ground through a kinematical linkage, with limited freedom, so that they can be slightly lifted, but otherwise are not allowed to exit from the frontal plane or rotate, to avoid the fall of the patient. Specifically, the exoskeleton is configured to perform three kind of exercises:

sagittal plane coordination: with both feet on the ground, left and right ankles, knees and hips are activated in pairs in the sagittal plane; it allows postural exercises like sit-to-stand and stand-to-sit transitions;

frontal plane coordination: transitions from double to single stance posture, with fixed knees, by shifting the weight of the patient from one foot to the other and then raising the free foot activating in the frontal plane the two hips; and intermixing sagittal and frontal plane coordination (like a step machine): similar to the previous exercise, but, contemporaneously to the hips in the frontal plane, a partially constrained free foot of a free leg is raised activating knee and hip in the sagittal plane (with three degrees of freedom).

The first two exercises can also be activated contemporaneously and independently, such as maintaining equilibrium during a quiet posture standing, or reaching limits of equilibrium in the sagittal or frontal plane, or recovering from externally imposed disturbances.

Figure 2:
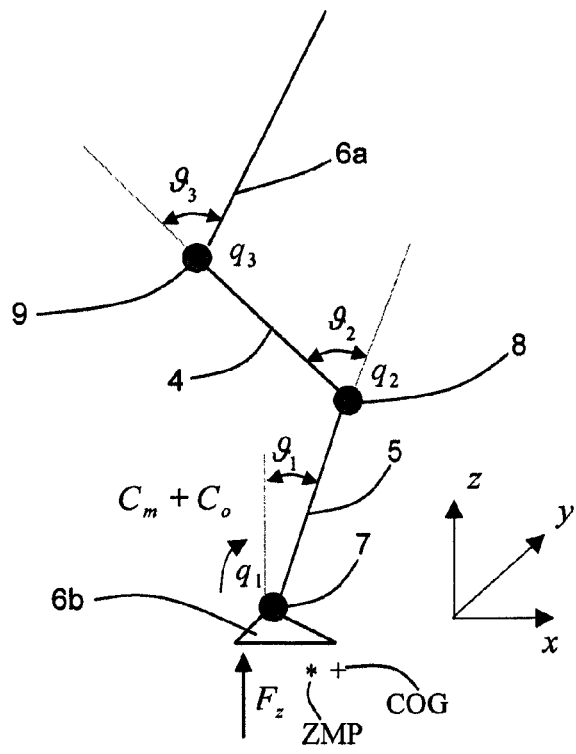
FIGS. 2, 3a and 3b show the dynamic model of the exoskeleton of FIG. 1, respectively in the sagittal plane, in the frontal plane, and in a third configuration (step machine) where the two planes are intermixed.
Figure 3A:
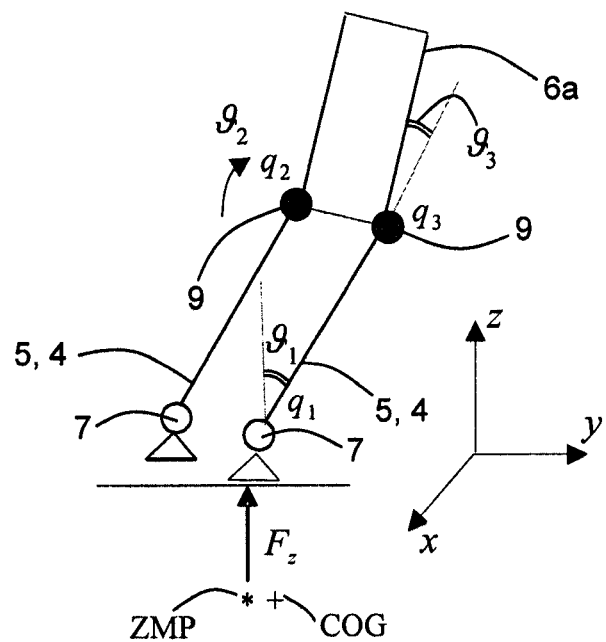
Figure 3B:
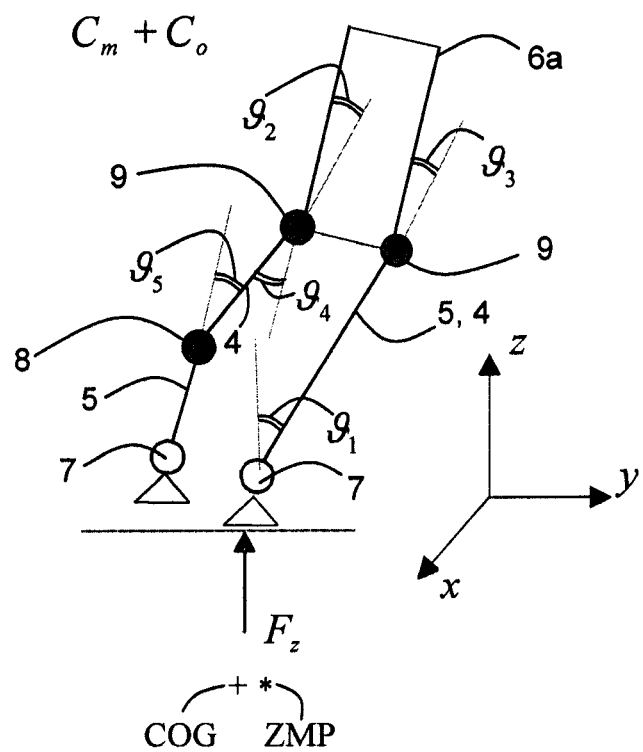

FIGS. 2, 3a and 3b show a link-segment representation for modeling the mechanical behaviour of the lower limbs of the patient, represented as a skeleton with rigid fixed-length limbs and perfect pivot joints, respectively in the sagittal and frontal planes; the control algorithm that will be discussed in detail in the following is based on this dynamic model.

The dynamic model possesses up to six degrees of freedom and is composed of two independent elements: a triple inverted pendulum in the sagittal plane, having three degrees of freedom, actuating the movement, in pairs, of ankles, knees and hips of the patient; and a switched system in the frontal plane with two configurations of a multiple pendulum in the form of a parallelogram or open quadrilateral, according to the phase of double or single stance, having one to three degrees of freedom, actuating both right and left hips and, in the single stance position, eventually also the ankle of the sustaining foot. Activities on the two planes can operate contemporaneously independently, but they can, also, be partially intermixed, lifting the coupling between the two legs, as in the case (step machine) when the free foot knee and hip of the sagittal plane are activated during frontal plane exercises. The control approach is common for the two planes, however sagittal and frontal planes have peculiarities that will be specifically dealt with by the control. The mixed case belongs to the realm of the frontal plane control.

In detail, FIG. 2 shows the ankle, knee and hip joints 7, 8, 9, considered in pairs; joint angles, as measured by the position/velocity sensors 16, are denoted with $\theta_i$ ($\theta_1$ for the ankle joints 7, $\theta_2$ for the knee joints 8 and $\theta_3$ for the hip joints 9), while $q_i$ denotes the generalized coordinates of the links, related to the joint angles $\theta_i$ ($q_1 = \theta_1$ is associated to the leg, $q_2 = \theta_1 + \theta_2$ to the thigh and $q_3 = \theta_1 + \theta_2 + \theta_3$ to the trunk of the patient 2). Moreover, $C_m$ denotes the motor torques applied by the electric motors and $C_0$ the patient torques exerted at the three joints (for reasons of simplicity, FIG. 2 only shows the torque applied at the ankle joints 7); ZMP represents the position of the so-called Zero Moment Point (i.e. the coordinate along the x axis at which the sum of all reaction torques acting on the soles of the feet are zero), COG represents the x-axis coordinate of the center of gravity of the patient body and $F_z$ denotes the ground reaction force directed along the z axis.

FIG. 3a only shows the ankle joints 7 and hip joints 9, since knee joints 8, have not freedom in the frontal plane; $\theta_1$ still denotes the angle for the ankle joint 6, while $\theta_2$ and $\theta_3$ here indicate the joint angles at the left and right hip joints 9, respectively. As in FIG. 2, the position of the Zero Moment Point ZMP, center of gravity COG on the y axis and reaction force $F_z$ are also depicted.

FIG. 3b adds, with respect to FIG. 3a, freedom of the hip and ankle joints of the free foot in the sagittal plane, whose respective joint angles are denoted with $\theta_4$ and $\theta_5$.

The control unit 12 is configured to implement a feedback position control to maintain the exoskeleton haptic device 1 dynamically stable in a vertical steady state position, or to constrain it to track a planned reference trajectory like a sit-to-stand transition in the sagittal plane, or a "waving" movement in the frontal plane involving shifting the weight of the patient from one foot to the other, followed by lifting the free foot, acting, either, on the left and right hips alone or involving also knee and hip of the free foot on the sagittal plane.

Independently from this position control, by exerting an effort with his leg muscles the patient is able to move the exoskeleton joints, in so doing, experiencing an elastic reaction from the position imposed by the feedback position control, with stiffness dynamically and directionally controlled by the control unit 12 exploiting the EMG signals detected from the leg muscles by the bioelectric sensors 14. This controlled "compliance" is used to obtain neurological involvement of the patient in the exercises and for tutoring the improvements in the patient abilities (the control will be set stiffer at the beginning, and softer at the end of the training, and progressively varied along these two limits), for helping the patient to maintain postural equilibrium or for addressing the patient movements directionally. In particular, vectorial control of the compliance allows to select one of the previous exercise configurations for rehabilitation.

Furthermore, according to a further aspect of the present invention, the control unit 12 will also implement a postural equilibrium module, superimposed to the position with compliance control module, interacting with the patient to maintain equilibrium or to regain equilibrium correcting any erroneous patient posture.

The control unit 12 will address the whole issues of position tracking, operator compliance, dynamical stability and postural equilibrium augmentation in a bipedal exoskeleton. In particular, if the above elastic reaction is soft, the patient will achieve whole compliance and he will be able to move substantially at pleasure—just having his gravity load alleviated by the control—until he reaches the limits of postural equilibrium, where the postural equilibrium module will intervene to stop him/her. On the other side, if a stiff reaction is imposed, the patient will be bounded to any reference position/trajectory that is applied to the exoskeleton haptic device 1 and his/hers actions will be considered by the control as a pure disturbance. By properly adjusting the control properties between these two limit conditions, it will be possible to closely follow the patient recovery during the rehabilitation treatment.

As will be discussed in detail in the following, the control unit 12 achieves the above results implementing: a first closed loop control for position and/or trajectory control (and patient compliance) based on joint angle position and velocity measures, computed with a H-infinite linear, fixed parameter or gain scheduling, multivariable robust control design with two degrees of freedom, using EMG signals from the lower limb muscles as measures of the intention of movement and strength of effort of the patient to offer compliance; and a second closed loop control superimposed to the first one for postural equilibrium, controlling the Zero Moment Point ZMP based on Lyapunov stability theory and the Jacobian function of the Center of Gravity (COG), based on the reaction forces detected from the reaction force sensors 17 on the foot rest 6b of the exoskeleton haptic device 1.

Figure 4:
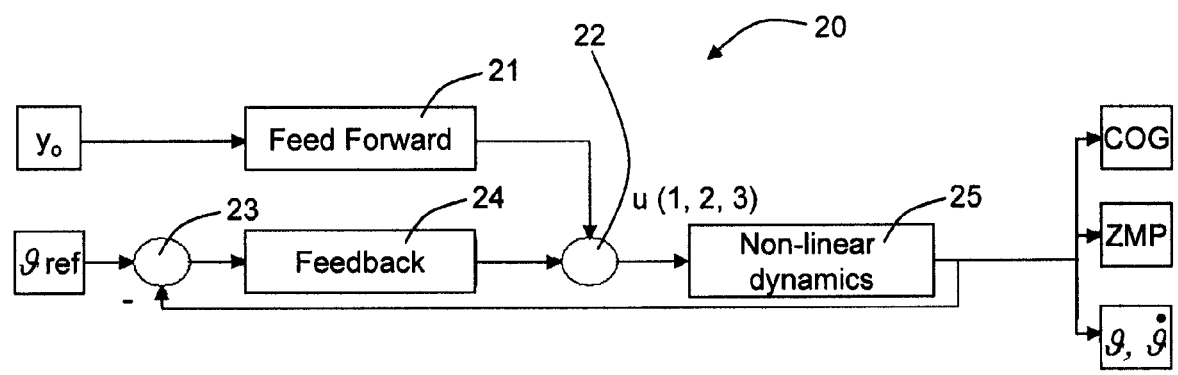
FIG. 4 shows the general block diagram of a primary closed loop of the control system: a control module for position tracking and patient compliance.

FIG. 4 shows a general block diagram of the first closed loop control (hereinafter defined as primary closed loop control and denoted with 20) implemented by the control unit 12. Its structure generally applies independently to either sagittal, frontal planes or mixed solutions. For clarity, the sagittal plane, as an example, is disclosed in the following.

The primary control loop 20 receives at input a vector of EMG signals $y_O$ (detected by the bioelectric sensors 14) as a measure of the patient torques $C_0$ (in particular including the torques exerted by the patient at each of the ankle, knee and hip joints 7, 8, 9) and thus indicative of the efforts measured from the patient, and a vector of reference joint angles $\theta_{ref}$, indicative of the desired position and/or trajectory imposed by the control to the ankle, knee and hip joints 7, 8, 9 (according to the rehabilitation exercise to be performed).

The EMG signals $y_O$, as a measure of the patient torques $C_0$, acts as a Feed-Forward control within the primary control loop 20 and is thus fed to a feedforward block 21, whose output enters a combiner block 22 (in particular an adder block).

The vector of reference joint angles $\theta_{ref}$ is instead exploited for position tracking in the feedback loop within the primary control loop 20 and accordingly enters a further combiner block 23 (in particular a subtractor), also receiving at its input (in particular the subtractive input) a vector of measures y, in particular a six dimensional vector of joint angle ($\theta$) and velocity ($\dot{\theta}$) measures associated to the ankle, knee and hip joints 7, 8, 9, and outputs a combination thereof (in particular a subtraction between the reference joint angles $\theta_{ref}$ and the measured joint angles in the measure vector y).

This combination enters a feedback control block 24, whose output is fed to the combiner block 22, to be added to the output of the feedforward block 21.

The output of the combiner block 22 represents the input signals $u_m$ (in particular driving voltages) to be supplied to the electric motors 10 in order to generate motor torques $C_m$, and enters the joint patient and exoskeleton non-linear dynamic system 25. The output of the non-linear dynamic system 25 is the vector of measures y, which, as previously discussed, is feedback towards the combiner block 23.

Joint angles $\theta$ and joint velocities $\dot{\theta}$ are directly obtained from measures y; moreover, from measures y and from the reaction forces measured by reaction force sensors 17, center of gravity COG and zero moment point ZMP for the patient-exoskeleton system (in particular their movement along the x axis with reference to the sagittal plane, or y axis for the frontal plane) are jointly estimated and provided as output (as shown schematically in FIG. 4).

Within the control algorithm, the primary control loop 20 guarantees robust stability in the presence of nonlinearities, unmodeled dynamics, parameter mismatching, and offers compliance to the operator while allowing joint angles tracking capability, as well as disturbance rejection. Reference joint angles $\theta_{ref}$ drive the joint angles so that they track desired position trajectories, while EMG signals $y_O$, as a measure of the patient torques $C_0$, enable controlled compliance with respect to the patient; in fact they allow to move the exoskeleton joint angles in the neighbors of the desired references ($\theta_{ref}$) with a desired and controllable visco-elastic impedance felt by the patient (the controlled compliance). In particular, the possibility to act independently on the compliance at the various (ankle, knee and hip) joints allows to achieve a vectorial control of the compliance in order to direct the patient to execute the desired exercise (and prevent spurious movements): for example, during frontal plane coordination exercises, knee movements will be blocked by stiffening the elastic impedance felt by the patient.

In general, control design is achieved through Hinfinite control theory: the compliance, in the form of admittance or impedance control with position feedback, is approached as a two degree of freedom control design with the EMG signals (representing a measure of the patient effort) as an input, and joint angle position and velocity as measured output. Basically, patient efforts are treated as measured disturbances to be accounted for by the control loop according to the desired compliance.

In a per-se known manner (as discussed for example in K. Zhou, J. C. Doyle, and K. Glover "Robust and Optimal Control", Prentice Hall, 1996), and as shown in the schematic block diagram of FIG. 5, in the Hinfinite approach the whole control problem is represented as a four gates (two inputs and two outputs) system, with disturbances (w) and commands (u) at the inputs, and objectives (z) and measures (y) at the outputs. This model is usually referred to as the "extended system" (ES) of the control design. The Hinfinite norm from disturbances w to objectives z of the closed loop (in the presence of a controller $G_c(s)$) offers a measure of achievement of the specifications, of robust stability and of the performances in the presence of uncertainties (represented by $\Delta$). The design technique synthesizes the closed loop controller $G_c(s)$, graphically depicted in FIG. 4, from measures y that maximize or guarantee the required performance and robustness.

The configuration in the sagittal plane is now described in detail.

The linearized model dynamics in the sagittal plane (as represented in FIG. 2) at the equilibrium point is given by the expression:

$$J\ddot{q}+\beta\dot{q}-mgbq+w=B(C_m+C_o)$$

wherein:

q is the three dimensional vector of generalized coordinates (the inertial or attitude rotational coordinates at the exoskeleton joints) related to the vector of measured joint angles $\theta$ by:

$$\theta = Mq;$$

$$M = \begin{bmatrix} 1 & 0 & 0 \\ -1 & 1 & 0 \\ 0 & -1 & 1 \end{bmatrix}$$

B is the input torque matrix, defined by:

$$B = \begin{bmatrix} 1 & -1 & 0 \\ 0 & 1 & -1 \\ 0 & 0 & 1 \end{bmatrix}$$

J is the 3×3 inertial matrix, $\beta$ the damping matrix, mgb represents the gravity forces, w is a noise vector accounting for the unmodeled Coriolis forces, $C_m$ are the motor torques applied by the electric motors 12 and $C_0$ the patient torques.

Moreover, the desired visco-elastic reaction offered by the controlled exoskeleton haptic device 1 to the patient 2 at each joint is of the type (desired stiffness and viscosity):

$$\beta_{Oi}\dot{\theta}_{oi}+k_{Oi}\theta_{Oi}=C_0 i, i=1,\ldots,3$$

i.e. having stable dynamics with elastic behavior of desired stiffness $k_{Oi}$ and viscosity $\beta_{Oi}$ decoupled between each joint.

Figure 6:
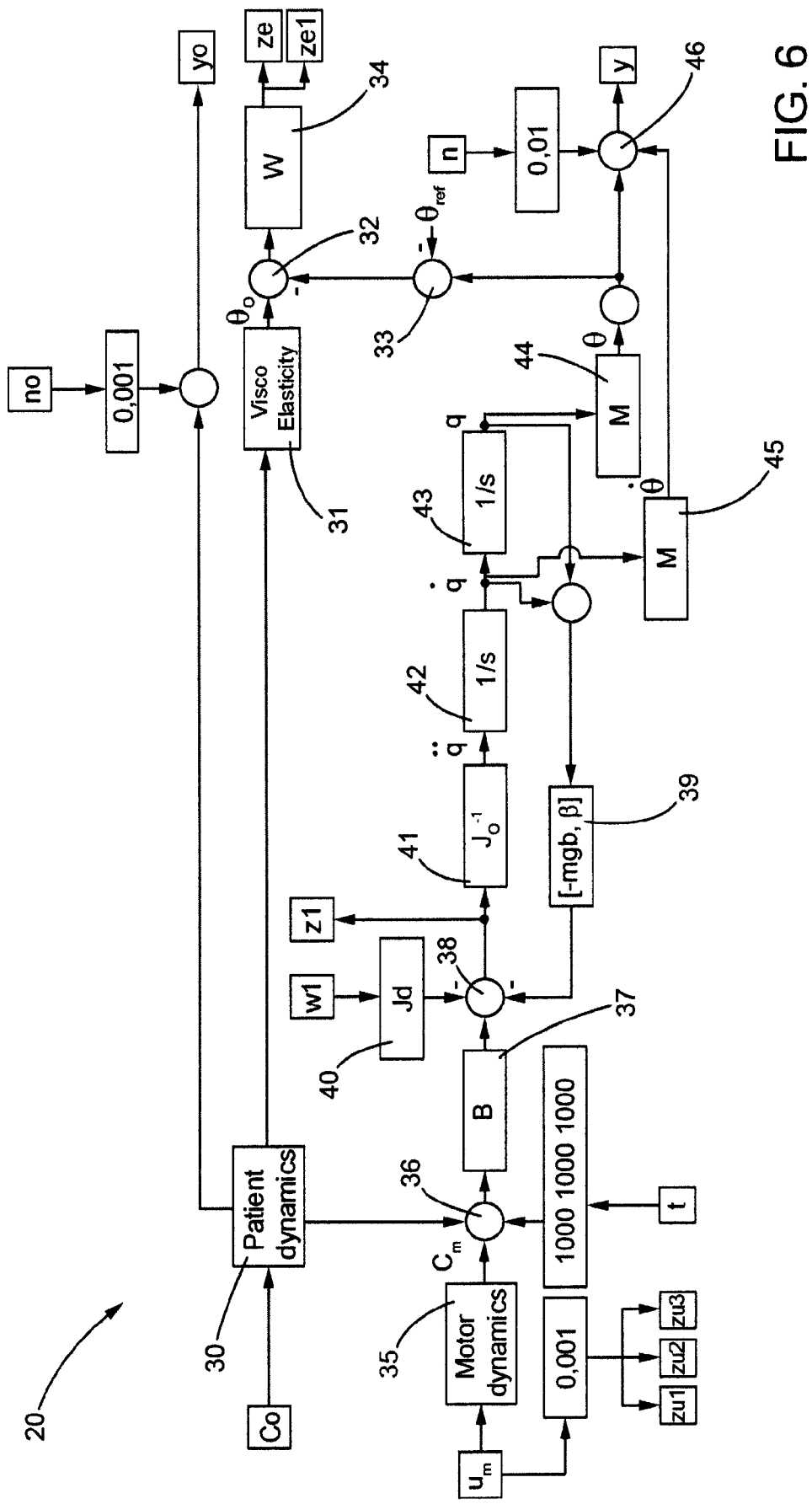
FIG. 6 shows a block diagram of the extended system embedding the requirements for the design of the primary closed loop of FIG. 4 in the sagittal plane, according to a first embodiment of the invention.

Based on the above models, the extended system for designing the Hinfinite two degree of freedom control of the exoskeleton haptic device 1 providing admittance control is obtained; the schematic block diagram of this extended system is shown in FIG. 6.

Figure 5:
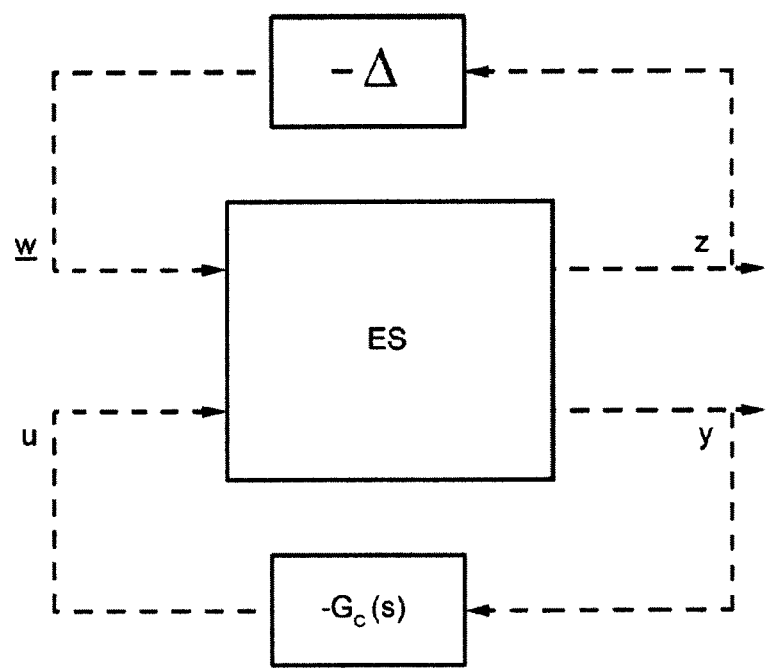
FIG. 5 shows a schematic block diagram of a general closed loop extended system in the presence of uncertainty for robust H-infinite design, on which control module of FIG. 4 is based.

In detail, the extended system receives at input the following disturbances (denoted with w in the generalized Hinfinite system model depicted in FIG. 5): the vector of patient torques $C_0$ (that are measured by the EMG signals $y_0$ detected by the bioelectric sensors 14); measurement noises no, n, respectively associated to EMG noise and joint angle position and velocity measure noises; noise $w_1$, representing the uncertainty introduced by the non-linearities of the system; and torque disturbances t. In particular, the various disturbances enter the extended system directly or multiplied by suitable multiplicative factors (as is shown in detail by the block diagram in FIG. 6), which are chosen according to the characteristics of the specific exoskeleton haptic device 1 that is being controlled.

The input signals $u_m$ to be supplied to the electric motors 10 (in order to generate the motor torques $C_m$) are received at input as controls (denoted with u in the system model depicted in FIG. 5).

The extended system provides at output the vector of measures y from the exoskeleton, the vector of the EMG signals $y_0$, and the following objectives (denoted with z in the system model depicted in FIG. 5): an admittance sensitivity objective $z_e$, penalizing the error between desired and achieved angular joint positions resulting from the patient torques $C_0$ (it thus sets the sensitivity to modeling errors of the admittance perceived by the patient); a disturbance sensitivity objective $z_{e1}$, relative to the sensitivity of the controlled outputs to torque noises t and operable to set the loop gain (i.e. the capability to reject disturbances and track reference signals); a non-linearity objective $z_1$, which takes into account the robustness of the control in face of system non-linearities; and noise objectives $z_{u1}, z_{u2}, z_{u3}$, penalizing control activities in face of the respective measurement noises no, n (EMG noise, joint position and velocity noises).

According to the extended system, the vector of patient torques $C_0$ is first processed in a patient dynamics block 30, containing time constants of the patient muscle response, and then fed to a visco-elasticity block 31, where it is multiplied by a diagonal matrix of the desired visco-elastic reaction to be experienced by the patient at each joint:

$$viscoElasticity = \mathrm{diag}\left(\frac{1}{k_o + \beta_o s}\right)$$

$k_o$ and $\beta_o$ being the desired stiffness and viscosity, respectively, in the patient admittance.

The visco-elasticity block 31 thus represents the integral of mechanical admittances, and compliance is achieved as an admittance control, where the viscoElasticity matrix sets the desired transfer function between patient torques $C_0$ and desired patient joint angles, denoted with $\theta_0$.

The vector of patient desired joint angles $\theta_0$ is input to a combiner block 32, which also receives at input the difference between the vector of measured joint angles $\theta$ and the vector of reference joint angles $\theta_{ref}$ (this subtraction being computed in combiner block 33). The output from combiner block 32 is then fed to a weighting block 34, where it is multiplied by a diagonal matrix W of weighting functions setting the desired loop gain, disturbance sensitivity, admittance tracking and frequency bandwidth for the feedback loop:

$$W = \mathrm{diag}\left(\frac{h}{s + \lambda}\right)$$

wherein h sets the loop gain and its inverse the steady state sensitivity, and $\lambda$ (rad/sec) the loop bandwidth (i.e. an indication of the frequency up to which the control performances are guaranteed).

Admittance sensitivity objective $z_e$ and disturbance sensitivity objective $z_{e1}$ are obtained at the output of the weighting block 34.

The vector of motor torques $C_m$ is first processed by a motor dynamics block 35 starting from the input signals $u_m$, containing time constants of the electric motors 10, and then fed to a combiner block 36 where it is added to the vector of patient torques $C_0$, as outputted by the patient dynamics block 30.

The result of this combination enters the model of linearized dynamics in the sagittal plane of the patient-exoskeleton system.

In particular, the output of combiner block 36 (i.e. the total mechanical torque) is multiplied, in a processing block 37, by the input torque matrix B (previously defined), and the result of this multiplication enters a combiner block 38, whose subtracting inputs receive the expression $\beta \dot{q} - mgbq$ computed in processing block 39, and, respectively, the non-linearity noise $w_1$ multiplied, in processing block 40, by a matrix $J_d$ accounting for the variation of the inertial matrix J due to nonlinearities, according to the model of inverse multiplicative uncertainty:

$$J(\Delta)^{-1} = (I + J_d \Delta)^{-1} J_0^{-1}$$

wherein $J_0^{-1}$ is the inverse of the inertial matrix J in nominal conditions, $J_d \Delta$ represents the uncertainty in the inertial matrix, and I is the identity matrix. In this respect, the present Applicant has experimentally shown that uncertainty on the sole inertial matrix J is sufficient to guarantee the desired robust stability of the controller and desired tracking precision of joint angles in all nonlinearity conditions.

The output from combiner block 38 is then multiplied by the matrix $J_0^{-1}$ in processing block 41, and then integrated twice (in integrator blocks 42 and 43, series connected) in order to obtain the first derivative of the vector of generalized coordinates $\dot{q}$, at output from integrator block 42, and the vector of generalized coordinates q, at output from integrator block 43.

Through multiplication by the previously defined matrix M, the vector of measured joint angles $\theta$ and the vector of measured joint velocities $\dot{\theta}$ are obtained, respectively in processing block 44 and in processing block 45, which are then combined through a multiplexer 46 to obtain at output the vector of measures y.

The objective of the control design is a feedback control of the motor torques $C_m$, from measures y and measured EMG signals $y_0$, such that for arbitrary patient torques $C_0$ the error between desired and achieved angular positions is maintained small, according to an Hinfinite operator norm, in face of the uncertainty (represented by $\Delta$ in the previous expressions). In particular, the double result is achieved to impose angle position and/or trajectory and to control patient compliance. This will force the controlled system to behave between the two limit conditions (set by the value assigned to the parameter $k_o$ in the design) represented by a full compliance to the patient torque $C_0$ and a full tracking of the reference joint angle $\theta_{ref}$, according to the desired viscoElasticity (defined in the visco-elasticity block 31) that will be physically perceived by the patient as a visco-elastic reaction.

Advantageously, a control minimizing the closed loop Hinfinite norm of the extended system of FIG. 6 can easily be computed through mu-synthesis (in a per-se known manner, here not described in detail).

Figure 7:
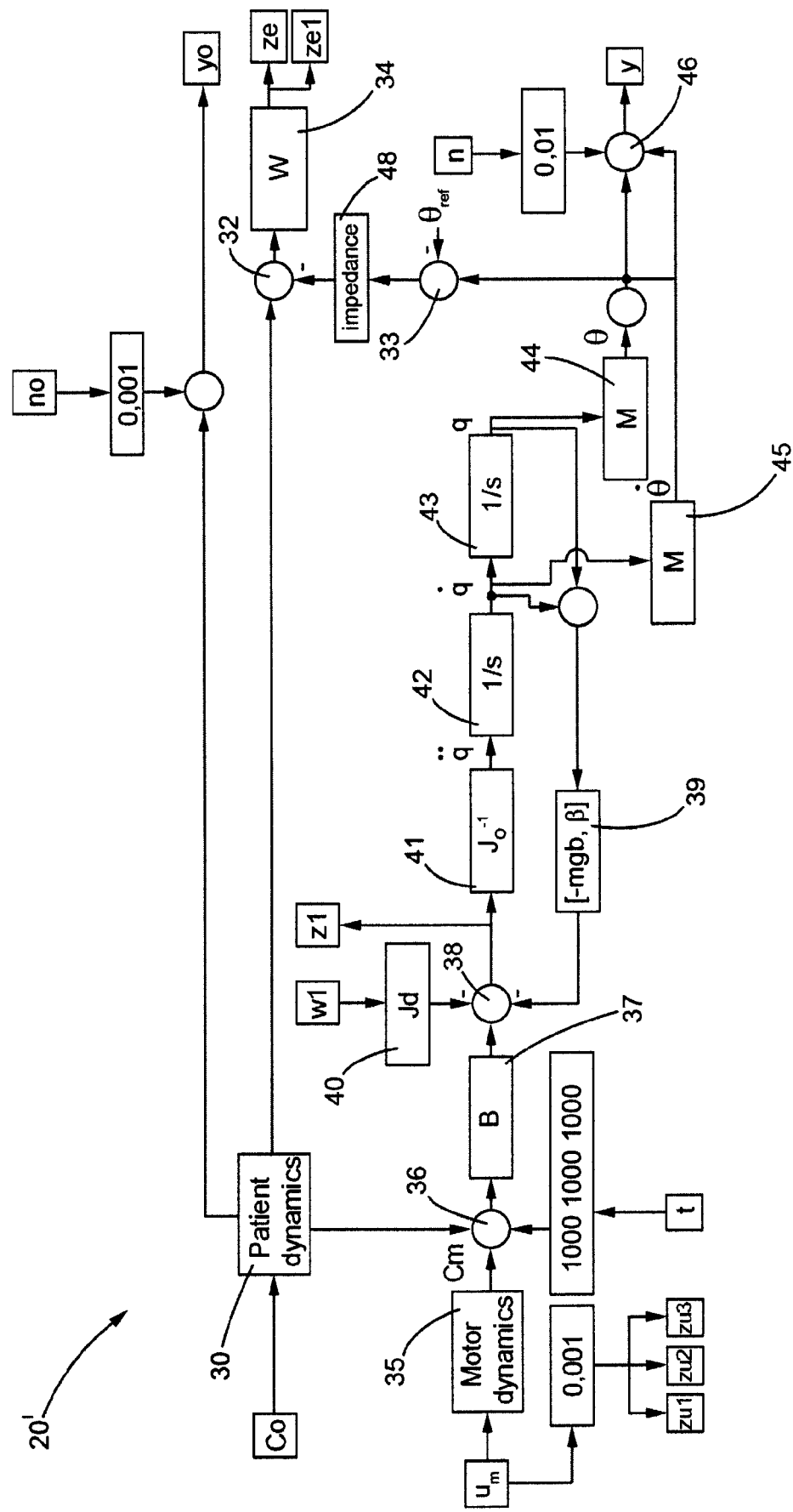
FIG. 7 shows a block diagram of the extended system of the primary closed loop of FIG. 4 in the sagittal plane, according to a second embodiment of the invention.

An altogether similar approach can be adopted to design an extended system with impedance control, as shown in the schematic block diagram of FIG. 7.

The extended system of the primary control loop (here denoted with 20') differs from the one previously discussed only in that the visco-elasticity (admittance) block 31 is replaced by an impedance block 48, which receives at input the difference between the vector of measured joint angles $\theta$ and the vector of reference joint angles $\theta_{ref}$ from combiner block 33 and the vector of measured joint velocities $\dot{\theta}$, and outputs a resultant torque. In this case, the difference between the torque applied by the patient and the torque resulting from the desired impedance is kept small by the control system.

FIGS. 8-11 show the results (obtained via simulations) achievable with the primary control loop control 20 in term of the closed loop transfer functions. The results are based on a realistic case study where the following parameters were used:

$$J_i = \frac{1}{12}m_i b_i^2; m_1 = 10 \text{ kg}, m_2 = 20 \text{ kg}, m_3 = 50 \text{ kg}, b_i = 0.6 \, m_i$$

$$\beta = 5 \text{ Nms/rad}$$

$$\omega_n = 10 \text{ rad/s}$$

$$k = 1e^{-2}$$

Figure 8:
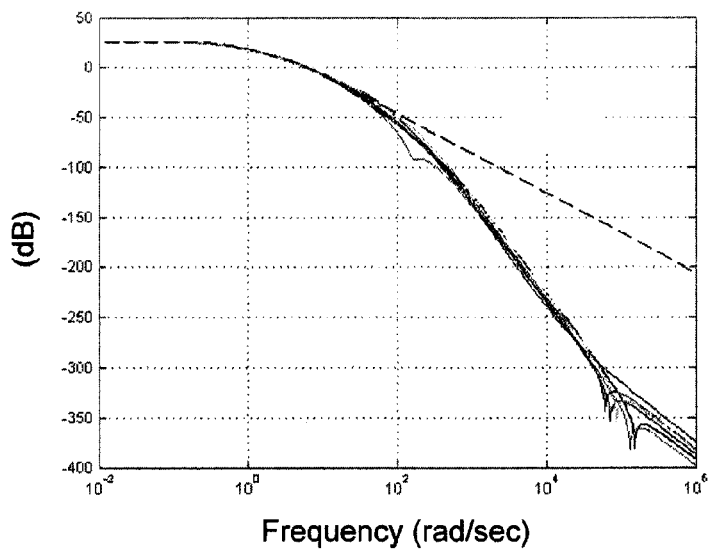
FIGS. 8-11 show plot related to the achievable performance of the primary closed loop in the control system.

In particular, FIG. 8 shows the achieved closed loop admittance in reaction to the patient torque. It is possible to achieve a very high gain (20 rad/N·m) in the ratio between patient torques and joint angles, i.e. the patient will experience a very soft reaction from the exoskeleton haptic device 1. The closed loop behavior follows very closely the desired curve (dashed line) in the frequency band where the control is active (set by the above defined λ parameter), in spite of the uncertainties and nonlinearities. In other words, a desired admittance (or impedance) is specified and substantially achieved based on the physical limits of the control and the bandwidth of the feedback loop that can be realistically obtained. Indeed, the achieved admittance diverges from the desired one only outside the loop bandwidth, while inside this frequency band the result is fairly insensitive to modeling errors.

Figure 9:
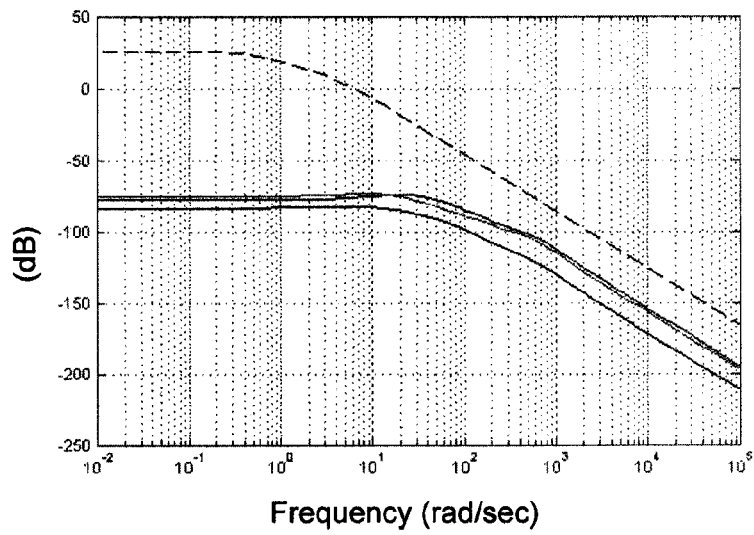

FIG. 9 shows the plot of the output sensitivity to external torque disturbances t. Various sources of disturbance, as well as undesired tilting movements of the patient, are strongly rejected, so that the desired posture position is preserved also in the presence of external disturbance actions (it compares very favorably to patient compliance, shown in dotted line).

Figure 10:
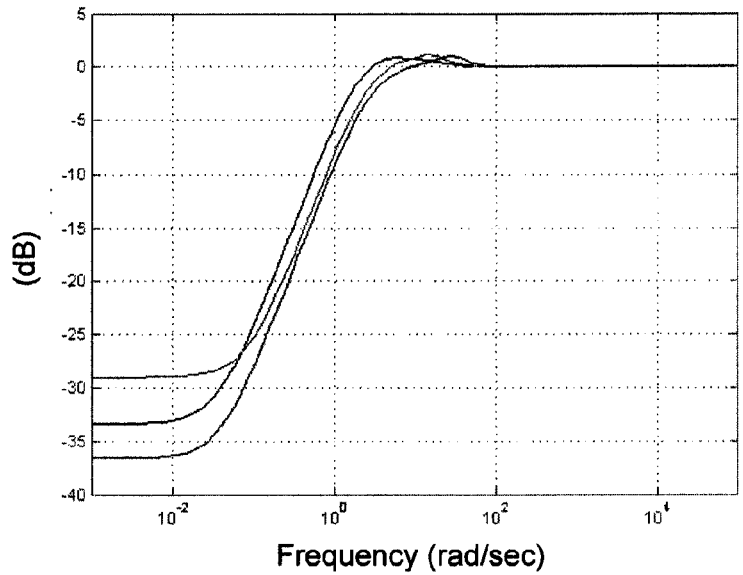
Figure 11:
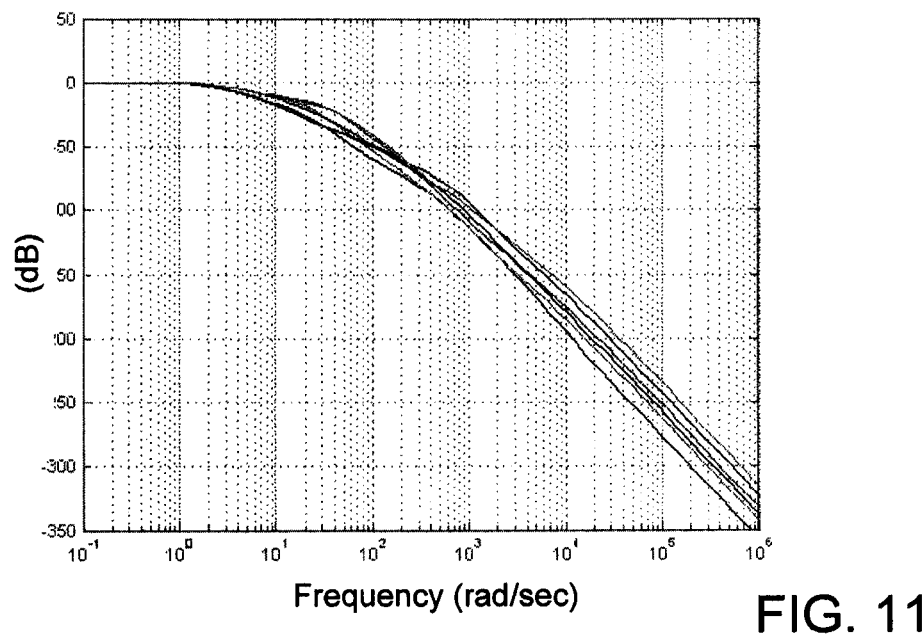

FIGS. 10 and 11 show, respectively, the classical loop sensitivity to output disturbances ad reference tracking transfer functions, underlying again that the loop gain related to the joint angles has a good insensitivity to disturbances and a good tracking capability on any configuration of nonlinearity (whose spread is represented in the figures).

The control model in the frontal plane will now be discussed in greater details.

The main feature of the frontal plane model is that of switching between two configurations, according to the single or double stance phase. For this purpose, a gain scheduling technique is adopted (as discussed for example in Geromel, Colaneri, Bolzern "Dynamic Output Feedback Control of Switched Linear Systems", IEEE Transactions on Automatic Control, Vol. 53, No. 3, April 2008).

During the double stance phase, the exoskeleton haptic device 1 can be considered as a parallelogram modeled by an inverted pendulum, with a single degree of freedom.

In this phase, the control scheme envisages controlling the ZMP/COG y coordinate, or better the rate of vertical reaction forces on the two feet. Starting from a perfect balance with the y coordinate of COG at the mid-point between the two feet, by controlling both hip torques (as shown in FIG. 2) the COG is moved on either the left or right foot, and accordingly the ground reaction forces on the other foot are brought to zero. At this point the control switches from double to single stance.

As for the sagittal plane, the admittance of the patient at the hip joints 9 is controlled. When vertical reaction forces are zeroed on one foot and this is freed from the ground, the control model switches to an open quadrilateral with up to three degree of freedom dynamics.

In double stance the control problem is trivial and it is not further detailed. Single stance, vice versa deserves greater attention.

In this case, if the supporting ankle joint 7 is actuated together with the two hip joints 9, the control scheme for the frontal plane becomes similar to the one in the sagittal plane, previously discussed.

However, the Applicant has observed that: differently from the sagittal plane, where equilibrium has to be preserved all the time, the exercise in the frontal plane is such that the patient is not expected to maintain equilibrium on single stance for a long time, but simply to briefly lift the free foot. Given the small width of the foot, the ZMP position is not expected to move along the y axis, as it does for the x axis, and can be simply kept at the foot center (ankle coordinate).

For this reasons, the Applicant has realized that an under-actuated control using the two hip torques as the sole controls can be implemented, leaving the supporting ankle free. The Applicant has shown that the system is controllable by the torques at the two hip joints 9, and dynamical stability can be guaranteed by state feedback.

As discussed for the frontal plane, a two degree of freedom control is again implemented, in order to allow the patient, based on the detected EMG signals, to move the free foot along desired vertical and horizontal coordinates. The patient will fill the free foot elastically attracted to its standing position, being able, nevertheless, to move it (according to the stiffness imposed by compliance control).

The Applicant has also noted that in this case dynamical stability is equivalent to postural stability, as the COG and ZMP are automatically imposed by dynamical stability of the feedback not to leave the ankle abscissa, and a module for postural control (as will be described in the following with reference to the sagittal plane) is not strictly needed. In particular, in this case a postural control module is absent with the exception of an inhibitor function (as explained hereinafter) that freezes compliance when an erroneous action of the patient sends the state dynamics to the limits of equilibrium.

Figure 12:
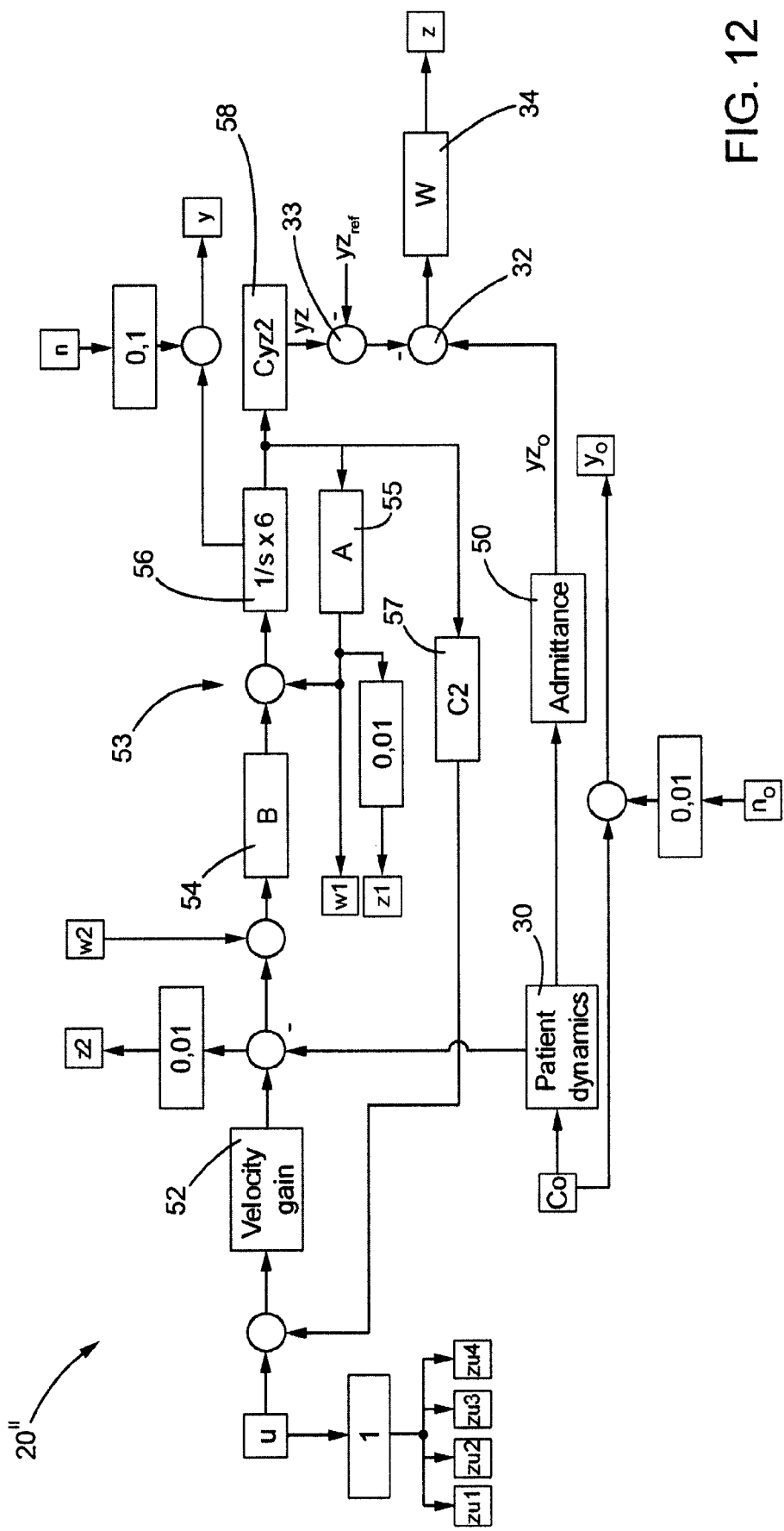
FIG. 12 shows a block diagram of the extended system for the primary closed loop of FIG. 4 in the frontal plane.

FIG. 12 shows the extended system (here denoted with 20") for the robust control in the case of the under-actuated solution in the frontal plane, adopting a two degree of freedom control design. The same reference numerals are used to denote elements similar to others previously defined. It is underlined that there are some structural (but not conceptual) difference in the extended system with respect to the sagittal plane, as a variant of the extended system has been tested here.

It is immediately apparent that an approach altogether similar to the one discussed with reference to FIG. 6 is implemented for controlling compliance towards the patient through the bioelectric EMG signals. The measured EMG signals $y_0$ are indeed used to evaluate the vector of patient torques, here constituted of only two components (representing the left and right hip joints 9), still denoted with $C_0$, which is then fed to the patient dynamics blocks 30 and to a desired admittance block 50 (altogether similar to the viscoElasticity block 31 of FIG. 6); the desired admittance block 50 models the admittance of the exoskeleton haptic device 1 and provides at output the desired y and z coordinates for the patient free foot, denoted with $yz_0$. The vector of desired patient y and z coordinates $yz_0$ is input to combiner block 32, which also receives at input the difference between the measured coordinates yz (estimated from the kinematics linking foot rest to the ground and the joint angles) and the reference coordinates $yz_{ref}$ for the same free foot, in turn computed in combiner block 33. The output from combiner block 32 is then fed to the weighting block 34, where it is multiplied by the diagonal matrix W of weighting functions, imposing the desired requirements for the sensitivity of the tracking error on the position of the free foot and on the admittance control.

Uncertainties enter the extended system in the form of both gain and dynamics multiplicative uncertainties, described by the pairs $z_2$, $w_2$ and $z_1$, $w_1$.

The vector of coordinates yz is the output of the linearized exoskeleton model. In particular, controls u to the model are here represented by driving velocities of the electric motors 10 of the hip joints 9. Indeed, the two electric motors 10 at both hip joints 9 are preliminarily closed in a local velocity loop, where velocity gain block 52 represents the velocity controller.

The output of the velocity gain block 52 is processed by a state variable model 53, linearization of the nonlinear system, with the following states: the supporting ankle, left and right hip joint angles, the two legs and trunk angular velocities. In this model, B (block 54) is the input torque matrix, A (block 55) is the coefficient matrix, related to the integrator block 56 (including six integrator blocks 1/s). From the states, block 57 (denoted with C2) derives the hip joint angles velocities for closing the internal velocity loop feedback. Block 58 (denoted with Cyz2) offers, instead, the y and z coordinates of the free foot, that, after comparison with the reference coordinate $yz_{ref}$ originate the admittance control requirements, setting the difference with the desired admittance.

Again, the controller is synthesized with mu-synthesis applied to the described extended system.

Figure 13A:
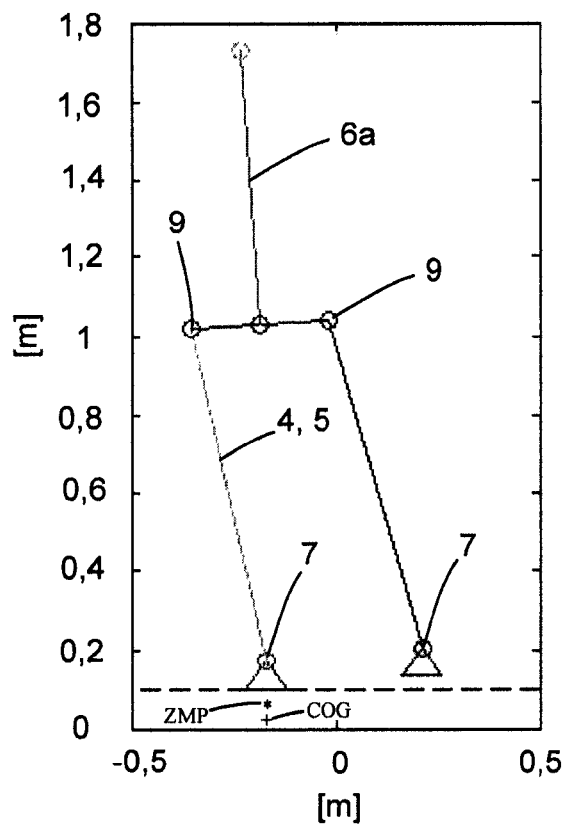
FIGS. 13a and 13b are schematic representations of the model of the patient body in different postures in the frontal plane.
Figure 13B:
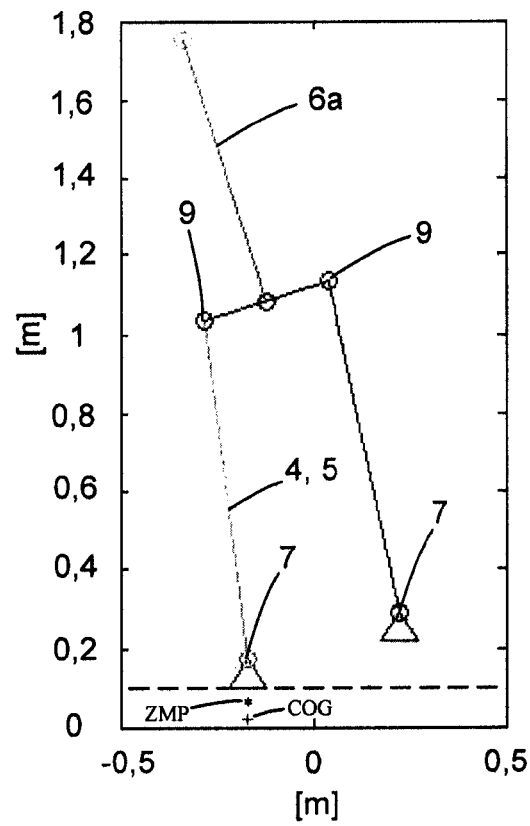

FIGS. 13*a* and 13*b* show, respectively, a single stance position on the right foot with COG on the sustaining foot, and the position resulting from a command to raise and move externally the free foot of about 4 cm along both the z and y axes.

Figure 14:
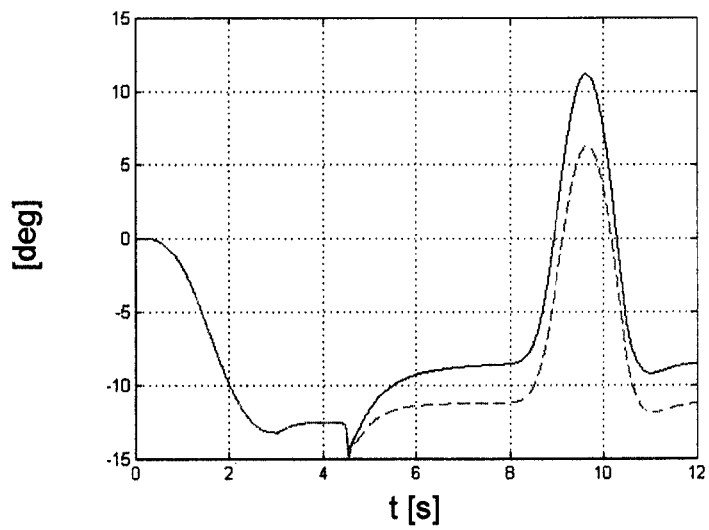
FIG. 14-16 show further plots related to the performance of the control system in the frontal plane.
Figure 15:
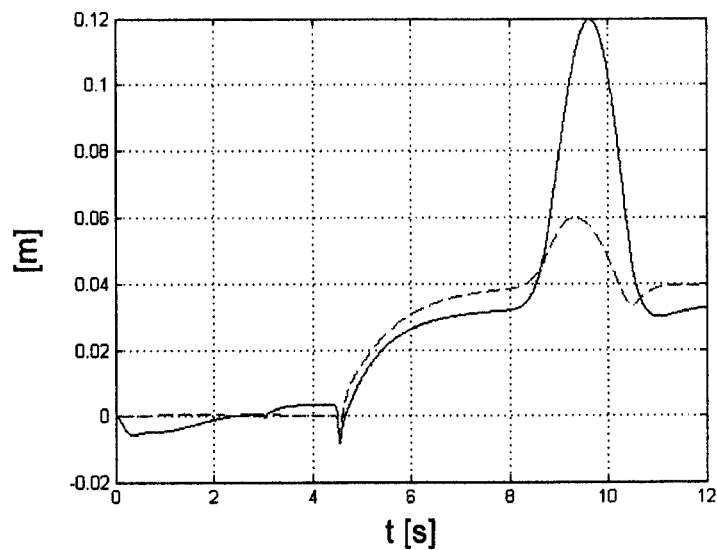
Figure 16:
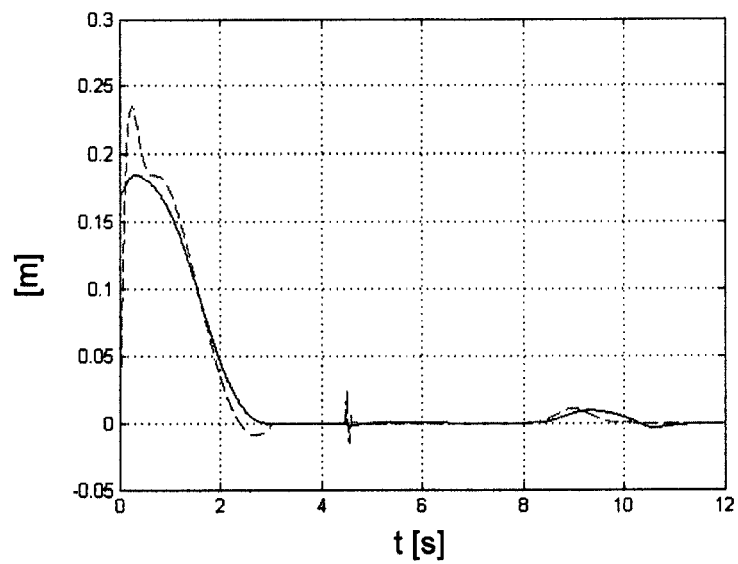

FIGS. 14-16 show time plots of quantities related to a transition from double to single stance, occurring after second 3, followed, after second 4, by the command to raise and move externally the free foot; afterwards, the system automatically compensates an external bell-shaped disturbance corresponding to a maximum torque of 10 Nm on the standing ankle at about second 8. This shows the robustness of the stability (postural equilibrium) in face of external or internal disturbances.

In particular, FIG. 14 shows the time plot of the hip joint angles (the continuous line corresponding to the right hip joint 9 and the dashed line to the left one); FIG. 15 shows the time plot of the displacement of the free foot along the z axis (continuous line) and the y axis (dashed line); and FIG. 16 shows the time plot of the COG (continuous line) and ZMP (dashed line) position (along the y axis) taking as reference the coordinate of the standing foot.

From FIGS. 14-16, the transition from double to single stance (COG and ZMP moving from the center point between the two feet to the center of the sustaining foot, conventionally assumed at coordinate 0), the switching of the control after second 4 with a displacement of the free foot from its original position along the y and z axes, and the perturbation introduced by the automatic control for compensating the ankle torque disturbance may all be noted.

The possibility of acting on the knee joint 8 and hip joint 9 to raise the free foot during single stance enters in the realm of the frontal plane control. The extended system of FIG. 12 also applies for this configuration. Inputs u now control the two hips on the frontal plane to maintain equilibrium and the hip and knee of the free foot on the sagittal plane to raise the foot.

According to the freedom allowed by the kinematics adopted for binding the foot to the ground, several situations can occur, in which the foot is free to: shift in all three coordinates x, y and z; translate along the z coordinate, only; rotate on the tip, only. The dynamical models change slightly but the substance remains invariant with respect to the extended system of FIG. 12, the model ranging from five to three degrees of freedom according to the binding of the foot.

Figure 17:
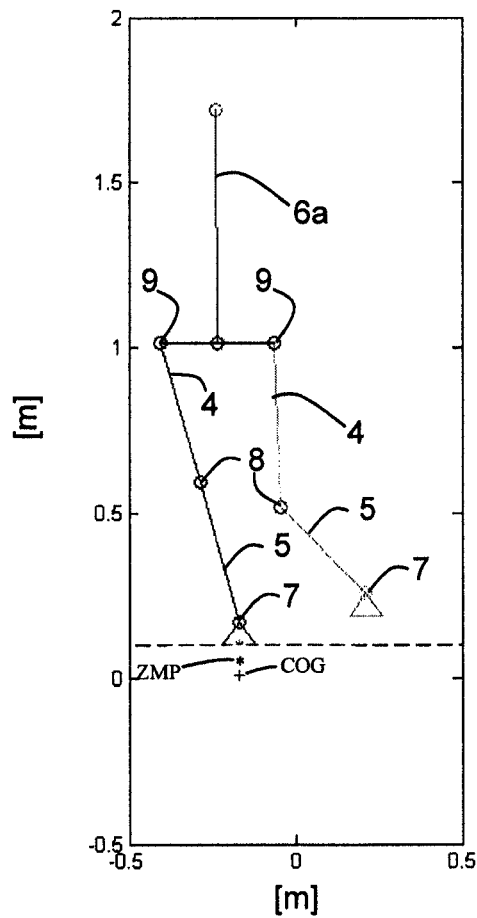
FIG. 17 is a schematic representation of the model of the patient body in still a different posture involving both frontal and sagittal planes.

FIG. 17 schematically shows the body model in a single stance equilibrium, with the elevation of the free foot being controlled by the knee joint 8.

Figure 18A:
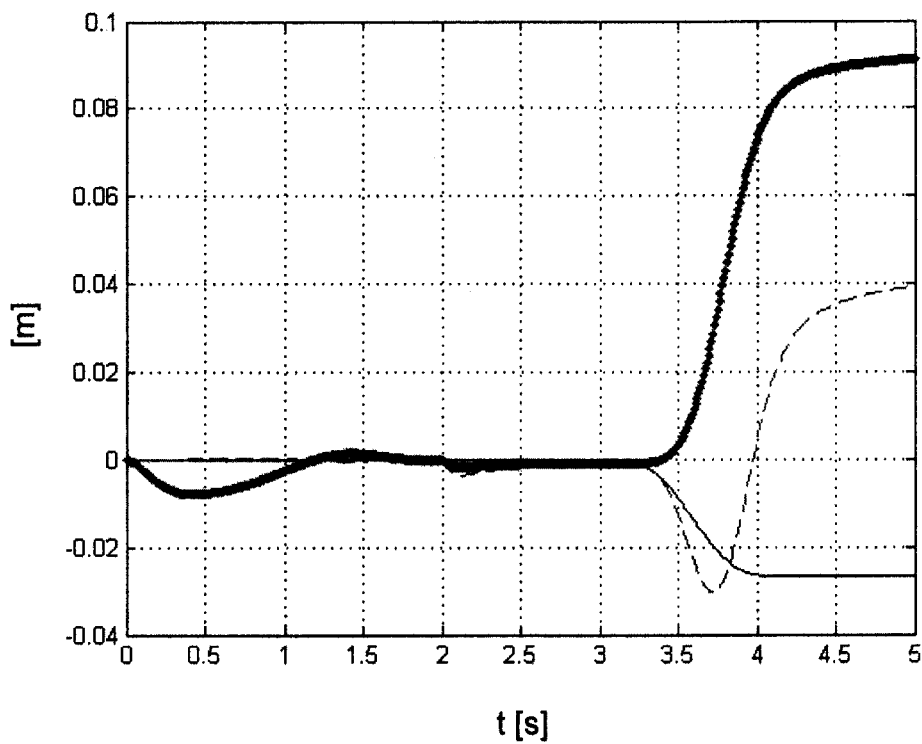
FIGS. 18a-18f show further plots related to the performance of the control system in the frontal plane.

FIG. 18*a* shows the x, y, and z coordinates of the free foot, in the case in which the free foot can translate along all three coordinates x, y and z (and the control has five degrees of freedom). In particular, the z coordinate is represented with a dotted line, the x coordinate with a continuous line and the y coordinate with a dashed line. Starting from second 2, the exoskeleton is in single stance; afterwards, starting from second 3, lifting of the free foot is performed.

Figure 18B:
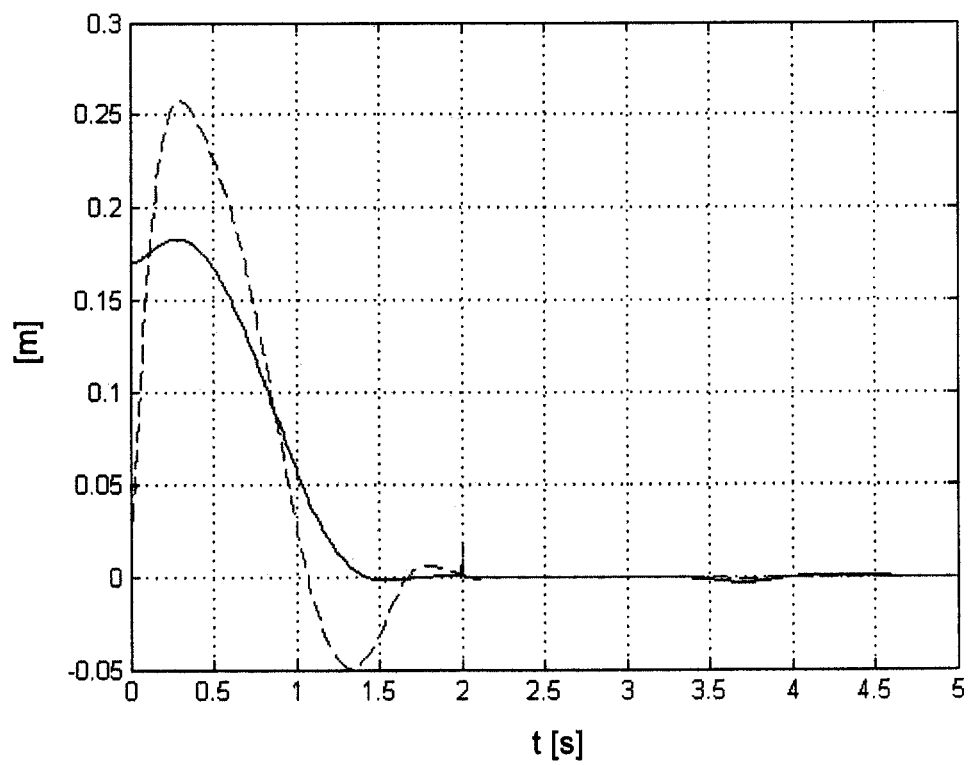

FIG. 18*b* shows the plots (obtained via simulation) of the COG (continuous line) and ZMP (dashed line) position along the y axis during the transition from double to single stance, followed by the perturbation introduced during lifting of the free foot.

FIGS. 18*c*-18*f* relates to the case in which the free foot is constrained to move along the z axis, only (and the control has only three degrees of freedom).

Figure 18C:
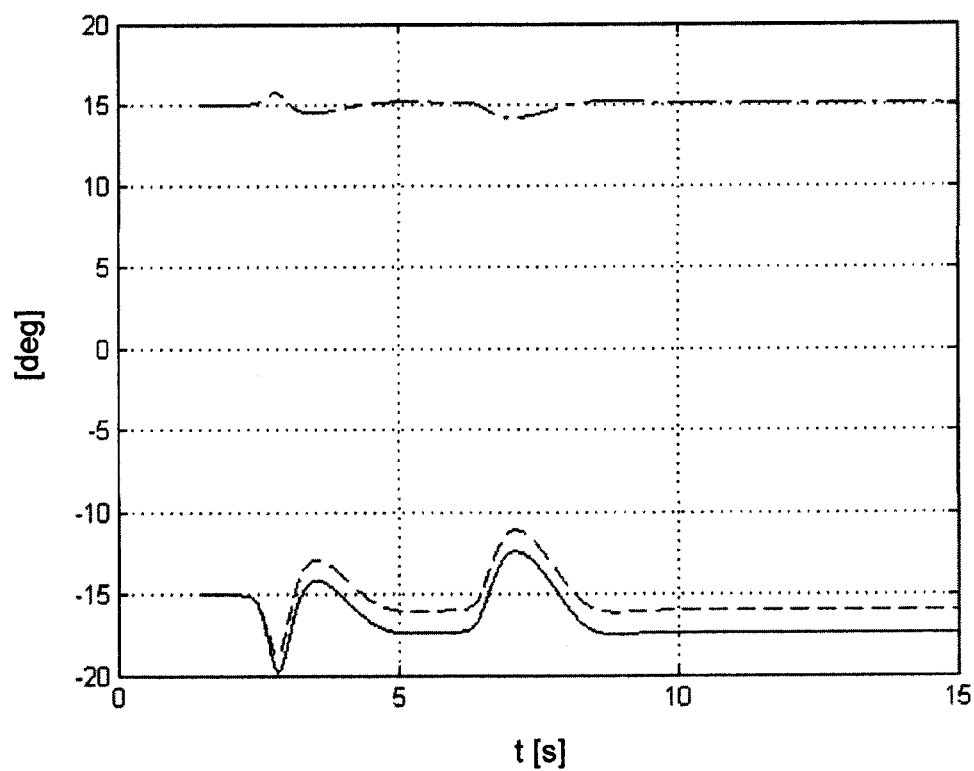

In detail, FIG. 18*c* shows the behaviour in the frontal plane of the ankle (dashed-dotted line), left hip (dashed line) and right hip (continuous line). After a transition from double to single stance, the free foot is raised vertically of about 0.1 m after second 3; then, the control compensates a bell shaped torque disturbance at second 6 on the sustaining ankle.

Figure 18D:
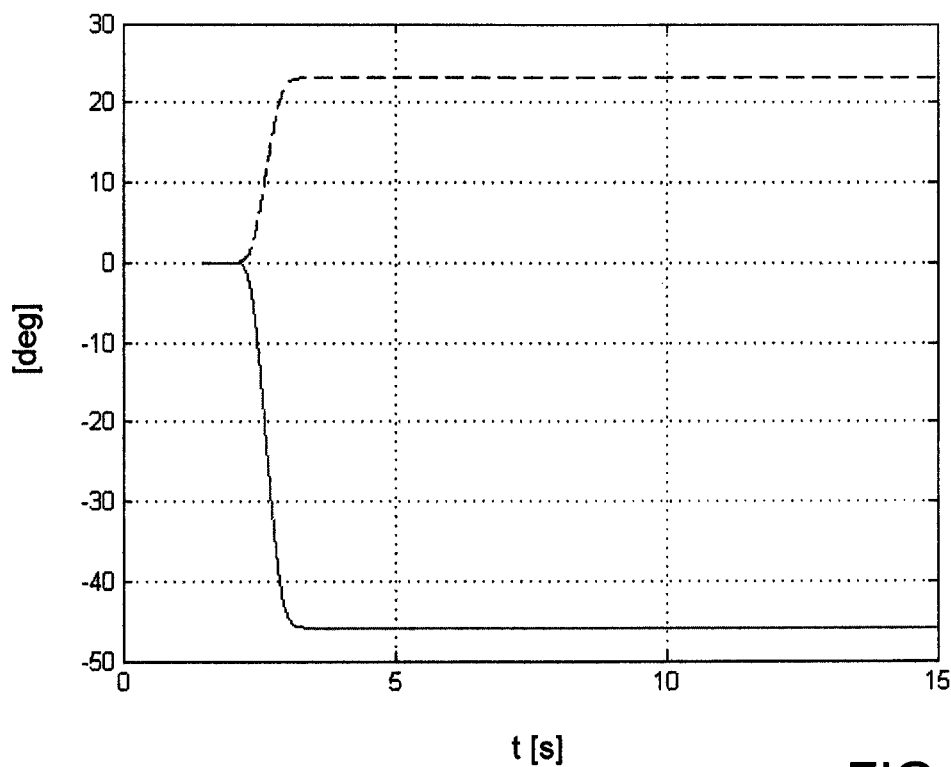

FIG. 18*d* shows the behaviour in the sagittal plane of the hip (dashed line) and knee (continuous line).

Figure 18E:
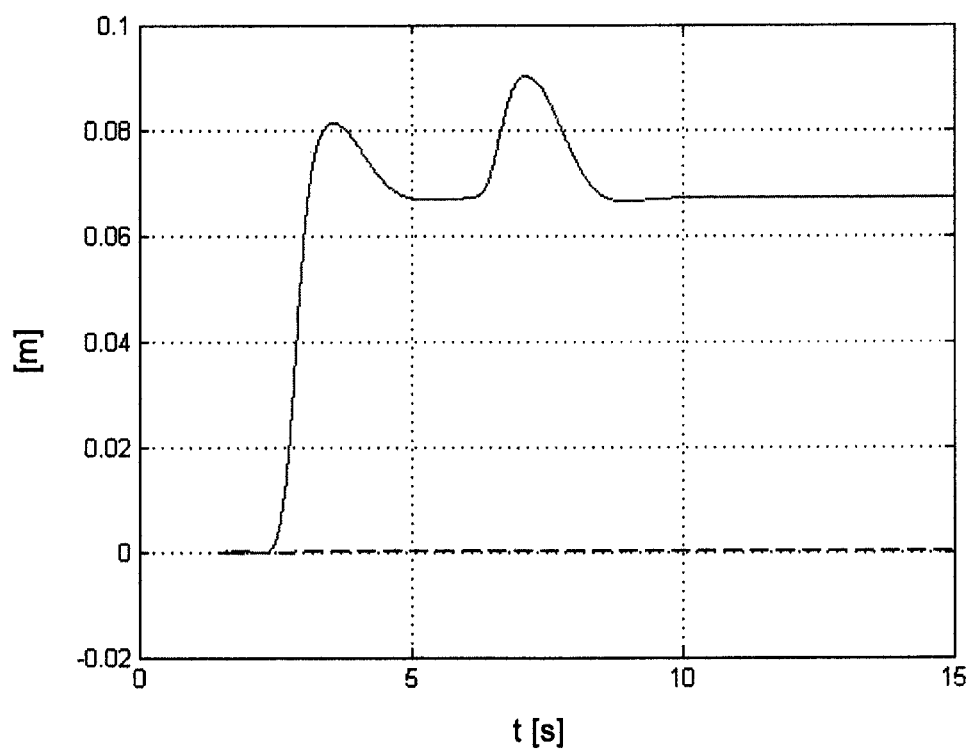

FIG. 18*e* shows the plot of the z coordinate of the free foot after the request of raising; the effect of disturbance after second 6 is evident.

Figure 18F:
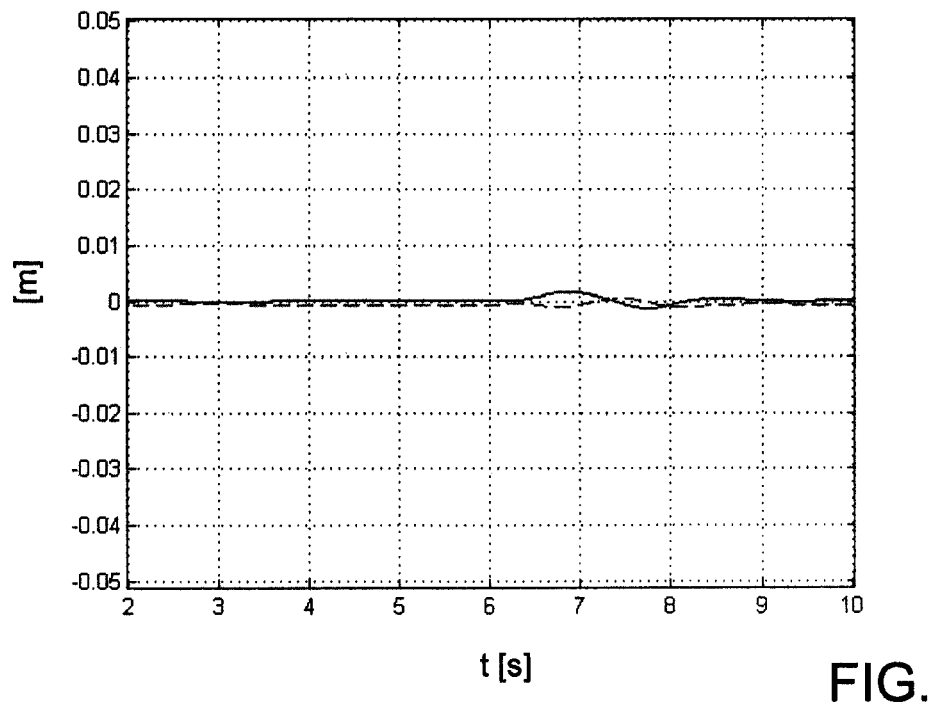

FIG. 18*f* shows the plots of the COG (continuous line) and ZMP (dashed line) position along the y axis, and in particular their perturbation as a consequence of the disturbance.

According to a further aspect of the present invention, that will now be described in detail, a second closed loop control may be superimposed to the primary control loop 20, in order to achieve postural equilibrium. This is discussed specifically, as an example, for the sagittal plane.

In fact, in order to guarantee postural equilibrium not only the primary closed loop dynamical system must be stable, but also the vertical force reaction of the pavement on the feet must remain inside the section of the supporting sole, during any postural transition or in response to external disturbances; otherwise the equilibrium is lost.

In steady state, the point at which the pavement reaction is applied is located at the x coordinate of the COG, which in turn is a nonlinear function of the joint coordinates and can be reliably computed therefrom. In dynamical condition, this reaction point is displaced from the COG by a nonlinear function mostly dependent on the COG accelerations. The reaction point is the above defined Zero Moment Point, ZMP, i.e. the x coordinate where the sum of all reaction torques acting on the soles of the feet is zero.

In order to guarantee postural equilibrium during a postural transition obtained as a result of the action of the primary control loop 20 (for position tracking and operator compliance), the body joints (and as a consequence the COG position) have to be controlled in order to maintain the ZMP (whose position is denoted with $p_{ZMP}$) in a region of postural equilibrium; for example, in the sagittal plane this region is in the range $-0.05 \text{ m} < p_{ZMP} < 0.25 \text{ m}$ along the x axis, assuming the ankle x coordinate as the origin.

The control technique adopted to achieve postural equilibrium control is based on three elements, each of which will be discussed in detail: the linearized inverted pendulum dynamics; a control law to preview or maintain in real time the ZMP on a given trajectory; and the Jacobian function of the COG, linking joint angle velocities $\dot{\theta}$ to the velocity of the COG along the x axis.

The expression, adopting the linearized inverted pendulum to represent COG and ZMP positions, is the following (a pure triple integrator from the COG jerk as input (the jerk being the third derivative of the position):

$$\frac{d}{dt}\begin{bmatrix} x \\ \dot{x} \\ \ddot{x} \end{bmatrix} = \begin{bmatrix} 0 & 1 & 0 \\ 0 & 0 & 1 \\ 0 & 0 & 0 \end{bmatrix} \cdot \begin{bmatrix} x \\ \dot{x} \\ \ddot{x} \end{bmatrix} + \begin{bmatrix} 0 \\ 0 \\ 1 \end{bmatrix} \cdot v$$

$$p_{ZMP} = \begin{bmatrix} 1 & 0 & -z_c/g \end{bmatrix} \cdot \begin{bmatrix} x \\ \dot{x} \\ \ddot{x} \end{bmatrix}$$

where $z_c$ is the approximate z coordinate of the COG, g is the acceleration of gravity, x is the position of the COG along the x axis, v is the COG jerk in the x direction that steers the COG evolution, and $p_{ZMP}$ is the above defined position of the ZMP.

Actual COG position is obtained from measured joint angles θ (using kinematics in a per-se known manner, here not described in detail), and the ZMP coordinates are measured from the pavement reaction force on the sole. Alternatively the position of the ZMP can be obtained through the following expression:

$$p_{ZMP} = -\frac{C_{m1} + C_{01}}{F_z}$$

where the expression $C_{m1}+C_{01}$ represents the total torque on the ankle joints 7, i.e. the sum of the measured motor torque $C_{m1}$ at the electric motor 10 and the patient torque $C_{01}$; and $F_z$ is the vertical reaction force on the sole measured by the force sensors 17.

In order to impose a desired reference trajectory $p_{ZMPr}$ to the ZMP during a planned postural transition, the COG trajectory:

$$\begin{bmatrix} x_r \\ \dot{x}_r \\ \ddot{x}_r \end{bmatrix}$$

must be computed in advance using a preview controller (see e.g. Shuuji KAJITA, Fumio KANEHIRO, Kenji KANEKO, Kiyoshi FUJIWARA, Kensuke HARADA, Kazuhito YOKOI and Hirohisa HIRUKAWA "Biped Walking Pattern Generation by using Preview Control of Zero-Moment Point", Proceedings of the 2003 IEEE International Conference on Robotics & Automation Taipei, Taiwan, Sep. 14-19, 2003); instead, in a stationary position both $p_{ZMPr}$ and $x_r$ are set to zero or to a fixed value. In particular, in order to guarantee correct tracking of the ZMP position, the COG must anticipate the ZMP response; this is the reason why a preview control is envisaged. In any case, preview is practical in rehabilitation exercises, as these are preplanned or periodic.

Accordingly, estimated values for the COG trajectory:

$$\begin{bmatrix} \hat{x} \\ \hat{\dot{x}} \\ \hat{\ddot{x}} \end{bmatrix}$$

and for the ZMP position $\hat{p}_{ZMP}$ are estimated in real time using a Kalman filter from actual COG and ZMP positions measured from the sensors associated to the exoskeleton haptic device 1, using the linearized inverted pendulum model.

Starting from these estimates, a velocity control of the COG is computed through the following feedback expression:

$$\dot{x}_{COGdes} = \dot{x}_r + k_x(x_r - \hat{x}) - k_z(p_{ZMPr} - \hat{p}_{ZMP})$$

where $\dot{x}_{COGdes}$ is the desired velocity of the COG set by the control. The desired position $x_{COGdes}$ is obtained by time integration of the previous expression.

According to an aspect of the present invention, this desired position $x_{COGdes}$ is translated into a perturbation of the reference joint angles $\theta_{ref}$ in the primary control loop 20 to guarantee ZMP tracking and consequent postural equilibrium. This is obtained using the Jacobian of the COG.

In particular, the coordinates of the COG are linked to joint angles θ by a nonlinear function f:

$$\begin{bmatrix} x_{COG} \\ z_{COG} \end{bmatrix} = f(\theta_1, \theta_2, \theta_3)$$

The Jacobian of the COG is defined as the linear relationship between measured joint velocities $\dot{\theta}$ and COG coordinate velocities:

$$\begin{bmatrix} \dot{x}_{COG} \\ \dot{z}_{COG} \end{bmatrix} = J \begin{bmatrix} \dot{\theta}_1 \\ \dot{\theta}_2 \\ \dot{\theta}_3 \end{bmatrix}$$

where J is the matrix of partial derivatives of function f with respect to θ:

$$J = \begin{bmatrix} \frac{\partial x_{COG}}{\partial \theta_1} & \cdots \\ & \cdots \end{bmatrix}$$

Given a trajectory for the joint angles θ, and consequently joint velocities $\dot{\theta}$, a velocity of the COG coordinates thus results. Vice versa, one of a possible set of joint velocities $\dot{\theta}$ can be computed from the desired $\dot{x}_{COGdes}$ through the pseudoinverse of Jacobian J.

Usually, there is redundancy between joint angles θ and the only one coordinate of the COG of interest, i.e. the x coordinate, so it is possible to exploit this redundancy to achieve, along with the desired trajectory of the COG (and equivalently of the ZMP) for postural stability, constraints in the movements of the joints, in order to force the patient along desired joint trajectories (as previously discussed for the primary control loop 20); e.g. this redundancy can be exploited to enforce well know ankle or hip strategies for maintaining equilibrium.

The perturbation of the reference joint angles $\theta_{ref}$ (denoted with $\delta\theta_{ref}$) is obtained using Proportional Derivative (PD) feedback from the desired $x_{COGdes}$ and $\dot{x}_{COGdes}$ given by the previous expression, with the following equation:

$$\delta\theta_{ref} = J_x^+ (k_p x_{COGdes} + k_d \dot{x}_{COGdes})$$

where $J_x^+$ is the pseudoinverse of the x component of the matrix J, and $k_p$ and $k_d$ are gains of the Proportional Derivative PD feedback of the posture stability control loop (or secondary control loop).

Selection of the feedback parameters appearing in the previous expressions will be dictated by tracking performance and overall stability. In particular, from a theoretical point of view, the choice of the feedback gains guaranteeing stability of this secondary control loop is dictated by the Lyapunov function theory (as recently discussed in Youngjin Choi, Doik Kim, Yonghwan Oh, Bum-Jae You "Posture/Walking Control for Humanoid Robot Based on Kinematic Resolution of CoM Jacobian With Embedded Motion" IEEE TRANSACTIONS ON ROBOTICS, VOL. 23, NO. 6, DECEMBER 2007 1285). In practice, the Applicant has found that tuning of these parameters, allowing to guarantee that the interaction of primary and secondary control loop preserves stability, may be achieved by the small gain theorem and experimental tracking performance evaluation.

Figure 19:
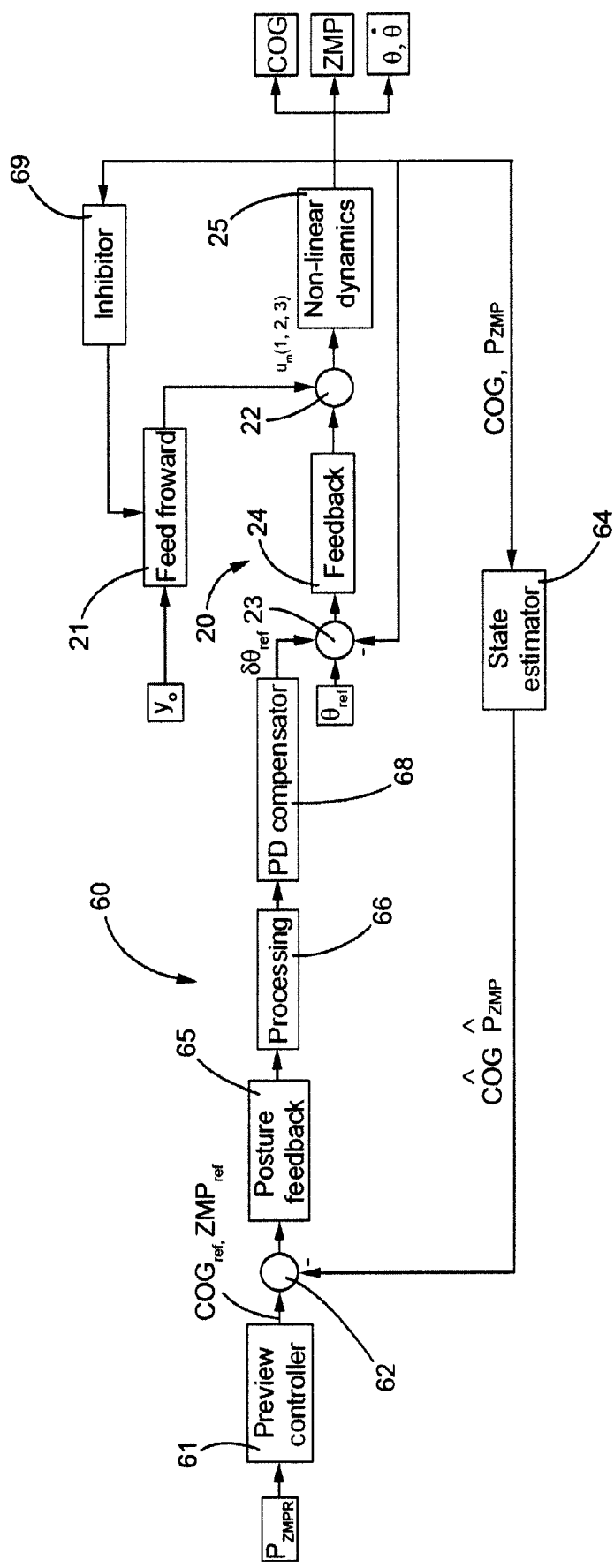
FIG. 19 shows a block diagram of a secondary closed loop, a control module for postural equilibrium control, superimposed to the primary closed loop of the control system.

The complete block diagram resulting from the combination of the primary control loop 20, guaranteeing dynamic stability, patient compliance and joint angle tracking, and the secondary control loop, denoted with 60, for postural equilibrium control, is depicted in FIG. 19 (where the same references are used to denote the elements of the primary control loop 20, here not described again).

Summarizing what has been previously discussed, the secondary control loop 60 includes a preview controller 61, which receives at input the desired reference trajectory $p_{ZMPr}$ for the ZMP and position and velocity of the COG computed in advance for a given exercise, and compare them in combiner block 62 with the estimated values of the COG trajectory:

$$\begin{bmatrix} \hat{x} \\ \hat{\dot{x}} \\ \hat{\ddot{x}} \end{bmatrix}$$

and of the ZMP position $\hat{p}_{ZMP}$, outputted by a state estimator block 64 implementing a Kalman filter and receiving at input the actual measured COG and ZMP position values at output from the primary control loop 20.

The output of combiner block 62 is then fed to a posture feedback block 65, implementing the above discussed feedback expression for the desired velocity $\dot{x}_{COGdes}$; the output of this posture feedback block 65 enters a processing block 66, configured to compute the (previously defined) pseudo inverse of the Jacobian; and the output of the processing block 66 is fed to a PD compensator 68, which outputs the perturbation $\delta\theta_{ref}$.

Perturbation $\delta\theta_{ref}$ is then inputted to a further input of the combiner block 23, to be combined with reference joint angles $\theta_{ref}$ and measured joint angles $\theta$.

Moreover, along with the described postural control, that adapts joint angles independently from the patient actions and joint references in order to maintain equilibrium, an inhibitor of the EMG signal input (and of the Feedforward control) is provided, based on the measured ZMP, in order to bind the freedom of the patient when equilibrium limits are reached. In particular, an inhibition block 69 is included in the primary control loop 20, receiving at input the measured ZMP position and outputting an inhibition command for the feedforward block 21, in order to temporarily inhibit the role of the EMG signals $y_0$ (and patient torques $C_0$) in the overall control system. This inhibitor temporarily increases the stiffness in the desired admittance present in the compliance control. This action allows to dynamically control patient compliance.

FIGS. 20-29 show simulation results where the exoskeleton haptic device 1, modeled by a three links nonlinear dynamics in the sagittal plane (see FIG. 2), is controlled for a transition from stand-to-sit and sit-to-stand and, in so doing, the center of weight is shifted from the ankle to the tip of the feet coordinate, and then back to the ankle.

Figure 20:
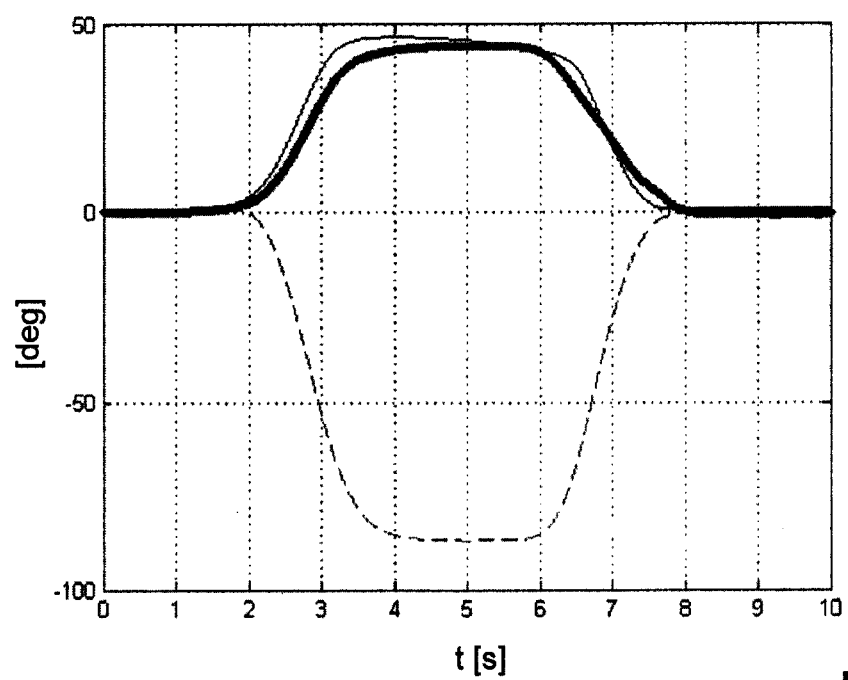
FIGS. 20-29 show still further plots related to the performance of the whole control system with the module for posture control enabled.

In particular, FIG. 20 shows the plots of the generalized coordinates q (link attitude angles measured in degree) during a transition from a standing to a sitting position on a chair and back to the standing position, for the ankle joints 7 (continuous line), the knee joints 8 (dashed line) and hip joints 9 (dotted line).

Figure 21:
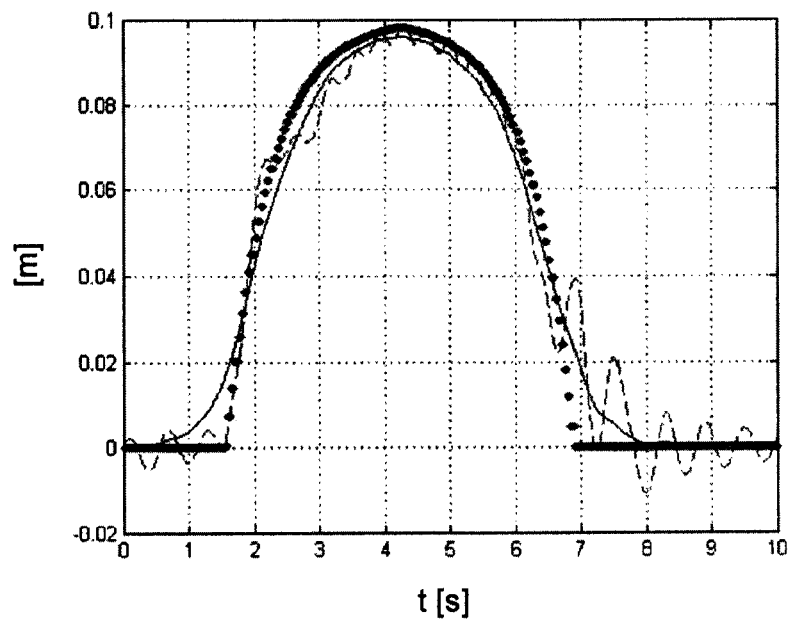

FIG. 21 shows the effect of the postural equilibrium module and in particular the time plots of the COG position (continuous line), ZMP position (dashed line) and reference (desired) trajectory for the ZMP (dotted line); the zero corresponds to the position of the ankle abscissa. During the transitions, the postural control operates to bring the ZMP from the ankle abscissa to the center of the foot and back, and proper perturbations by the postural control are added to the reference angle trajectories (as it is evident from the ZMP behavior that tracks fairly accurately the reference). The trajectory of the COG anticipates, through the preview control, the actual path followed by the ZMP, so as to guarantee a correct tracking.

Figure 22:
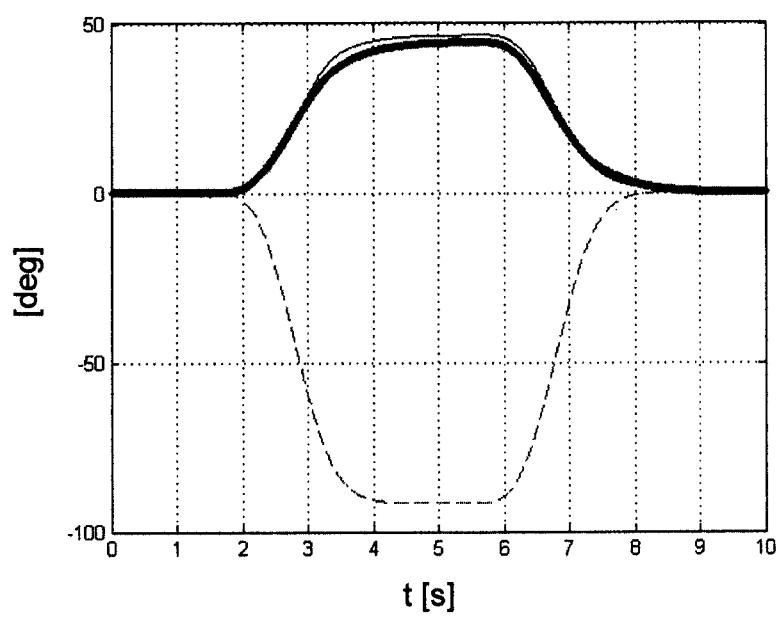
Figure 23:
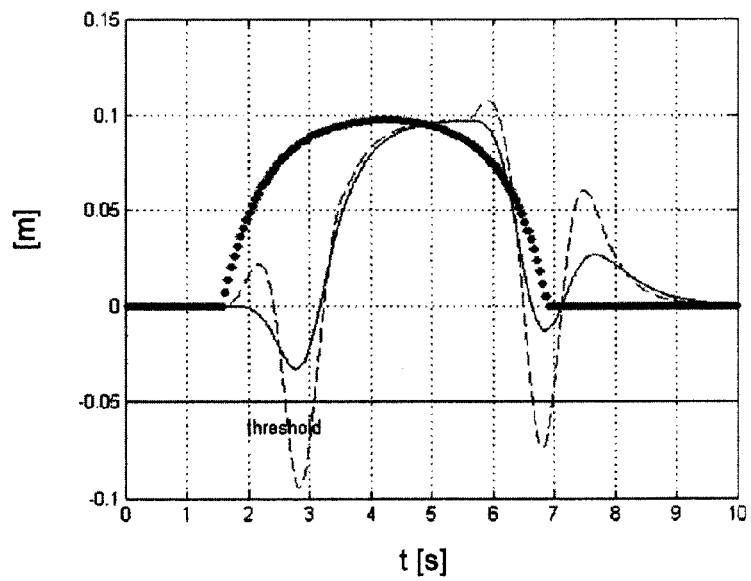

FIGS. 22 and 23 show plots similar to those of FIG. 20 and, respectively, FIG. 21: the same transitions are shown, but where postural control is inhibited.

While the generalized coordinates q associated to the limb movements (FIG. 22) show small differences with respect to the case of FIG. 20, FIG. 23 clearly evidences that equilibrium is lost (the patient falling on his back) because of unaccounted swings of the ZMP position (which exceeds the inferior equilibrium threshold, shown at −0.05 m from the ankle abscissa).

In a second example, the joint references for the transition are erroneously chosen.

Figure 24:
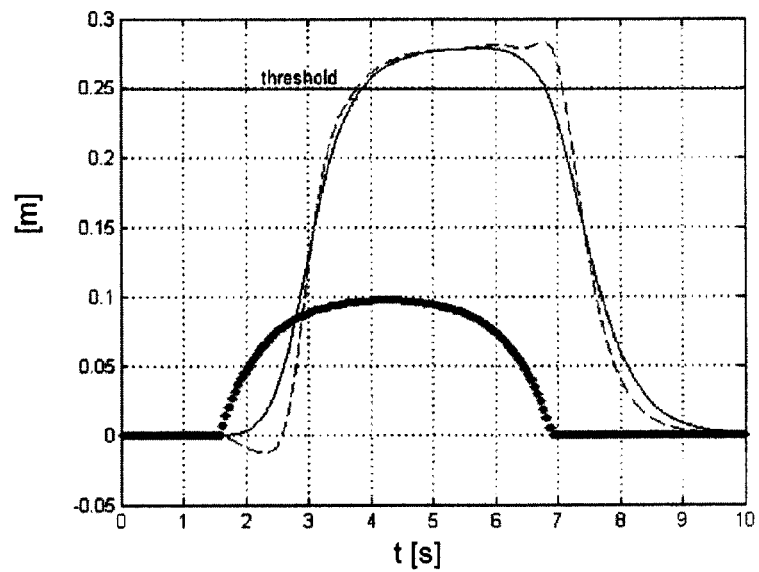

FIG. 24 shows the resulting COG and ZMP plots when postural control is deactivated, and the fact that equilibrium is lost (the patient falling down in front of him/her), due to the ZMP position exceeding the upper equilibrium threshold, shown at 0.25 m from the ankle abscissa.

Figure 25:
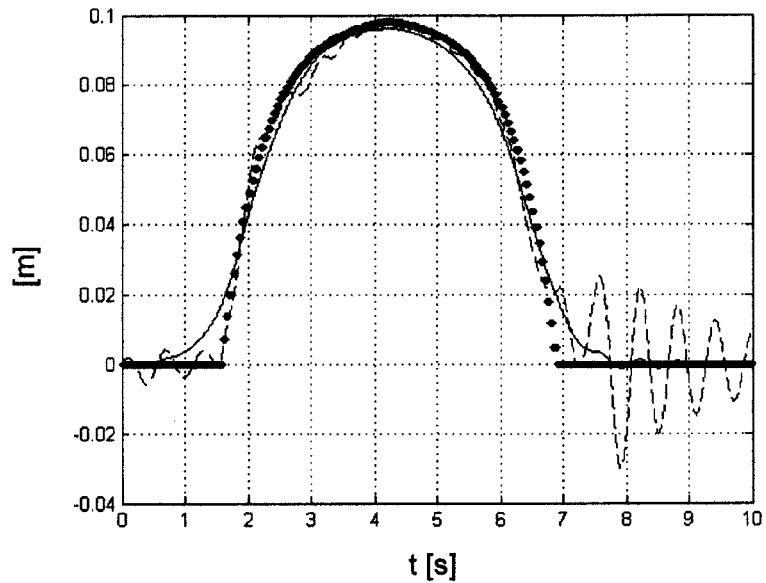

On the contrary, FIG. 25 shows that also in this case the action of the postural control allows to maintain the equilibrium, operating to correct the improper joint trajectories.

In a third example, during the imposed transitions, an erroneous patient action is simulated, in particular the action of pushing the ankle forward.

Figure 26:
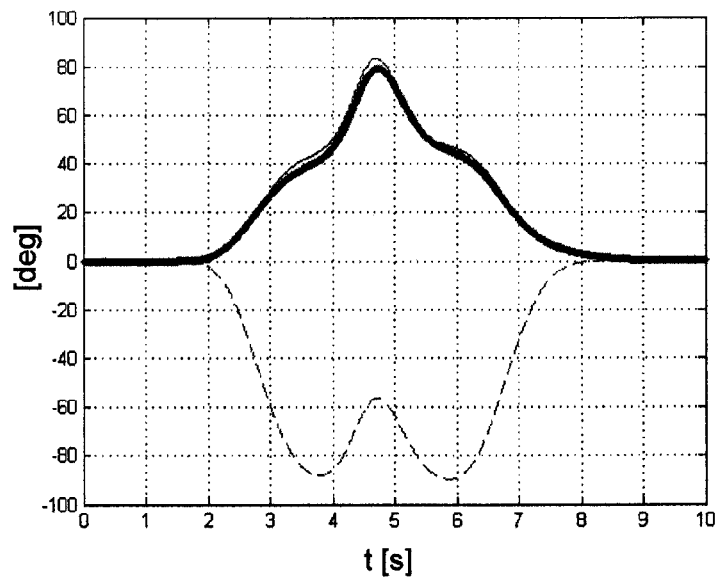
Figure 27:
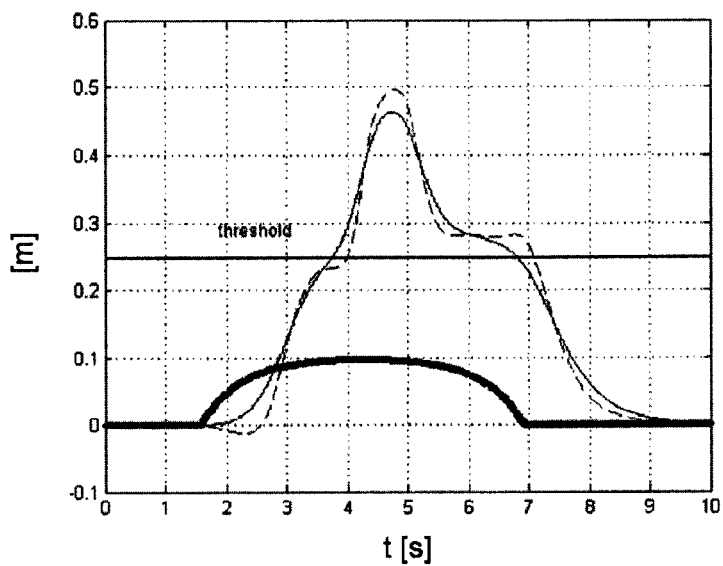

As shown in FIGS. 26 and 27, without posture control, the patient clearly looses the equilibrium (the equilibrium threshold is clearly exceeded).

Figure 28:
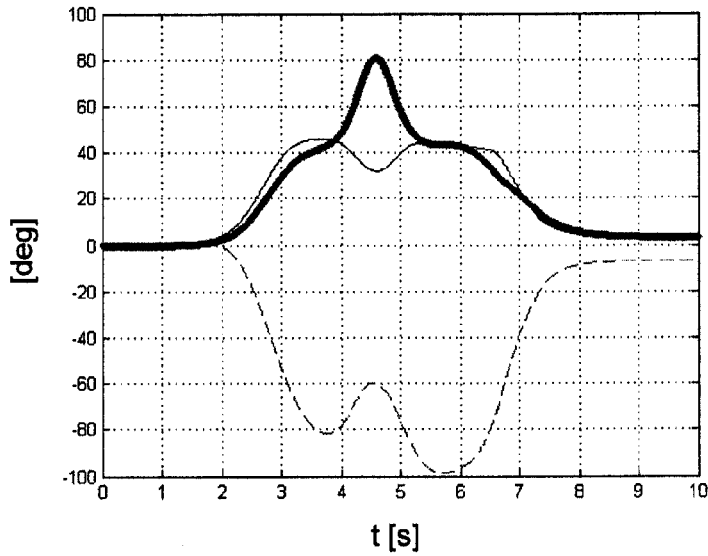
Figure 29:
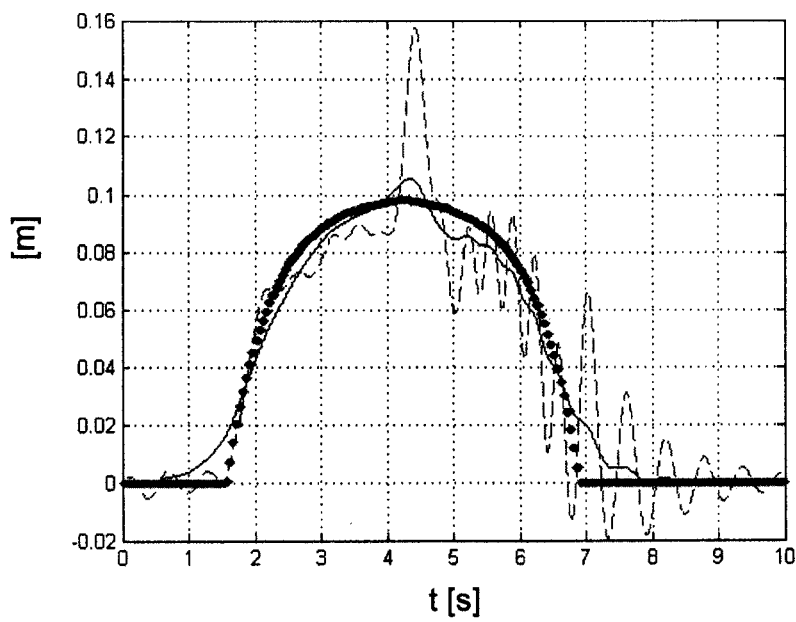

On the contrary, as shown in FIGS. 28 and 29, the action of the postural control intervenes to recover and preserve postural equilibrium controlling the knee and hip joints 8, 9 to automatically correct the erroneous angle at the ankle joints 7 imposed by the patient.

Figure 30:
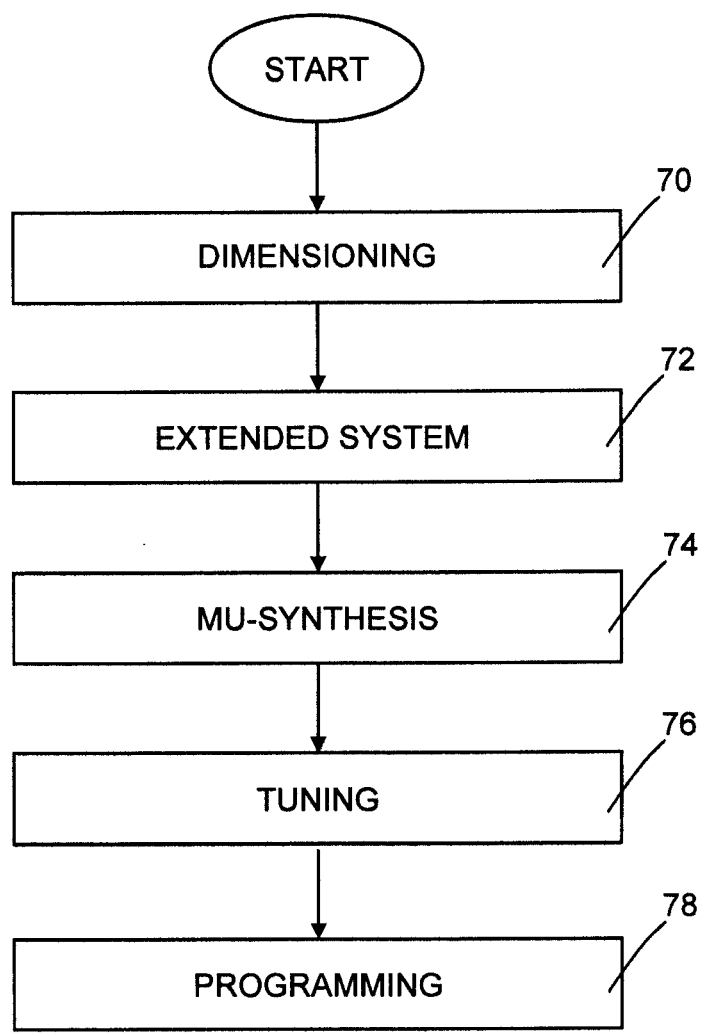
FIG. 30 is a flow chart relating to operations for designing the control system according to the invention.

The steps for designing the control of the lower limb exoskeleton haptic device 1, guaranteeing dynamic stability, compliance with the patient and postural equilibrium are synthesized in FIG. 30.

In a first step, denoted with 70, the three linearized dynamical models of a triple inverted pendulum in the sagittal plane, an open/closed quadrilateral in the frontal plane and the mixed (frontal-sagittal plane) solution are dimensioned according to the anthropometric data of the patient and the mechanical data of the exoskeleton haptic device 1. As it has been shown previously, this step is not critical, as the described robust control design easily accommodates approximations.

In a second step, denoted with 72, the desired performance requirements of the control system are specified, among which: viscoelasticity of the reaction (and the associated properties of the compliance experienced by the patient), sensitivity to disturbances, tracking capabilities, allowable control activity (in particular, by regulating the control weighting functions it is also possible to enforce ankle or hip strategy for posture control, as it is well know by physiotherapists to happen to human beings). All these data are synthesized in the resulting extended system for robust control design. The compliance properties of the control may advantageously be adjusted as the physiotherapy treatment proceeds, in order to follow the recovery and the improvements of the patient.

In a third step, denoted with 74, the closed loop control is synthesized with a technique of mu-synthesis from the extended system, and satisfaction of the specifications is tested through the resulting Hinfinite norm of the extended system in closed loop.

The preview controller and feedback control for posture control of the ZMP position are precomputed, as they only depend (in a per-se known manner) on the height of the barycenter of the patient. However, in a fourth step, denoted with 76, a tuning is performed of the feedback parameters of the equilibrium module, along with the PD controller parameters, in order to fit to the primary control loop 20; this tuning is done using Lyapunov theory and the small gain theorem to avoid interferences between the internal and external control loops and guarantee stability.

In a fifth step, denoted with 78, exercises according to the protocol defined by a physiotherapist are pre-programmed, and the exoskeleton haptic device 1 and the associated control system are ready to be applied to the patient for rehabilitation.

From the foregoing description, the advantages that the exoskeleton haptic device and the related control system allow to achieve may be immediately appreciated.

In particular, it is again underlined that a dynamically stable system is provided, which is able to track desired positions and trajectories, to maintain postural equilibrium and to interact with the operator/patient, offering a controlled compliance, using a two degree of freedom control design. The desired mechanical reaction felt by the patient is accurately controlled, via the direct detection of bioelectrical signals, in particular EMG signals. Since the patient torques act as an additive input disturbance with respect to the exoskeleton position control, it is possible to adjust the control design from a stiff control (where disturbance is strongly rejected, i.e. the operator is strictly bounded by the control) to a relaxed control (where the patient experiences a very little constriction from the exoskeleton). The possibility to statically and dynamically control patient compliance advantageously allows to stimulate neural plasticity for patient recovery.

The architecture of the exoskeleton and the rehabilitation exercises are conceived to guarantee parsimony in the design; in particular, each control configuration handles an average of only three degrees of freedom, reaching at most five degrees of freedom.

The advantage of the disclosed control approach is that of fully exploiting the power of feedback. Once a control loop robustly stabilizes a non-linear system with a proper frequency band, it greatly reduces nonlinearity effects and the sensitivity on parameter uncertainty and unknown disturbances. An unreliable inverse dynamics, as generally done in other known approaches, to evaluate patient torques or even gravity contributions is not any more needed to activate the joints under action of reference signals or patient efforts, since this is naturally achieved by the feedback action.

Hinfinite robust control theory, through the definition of the extended system, offers a systematic way to pose requirements for the control problem and, once admissibility has been tested through Hinfinite norm for the given class of problems, to generate with a straightforward algorithm (mu-synthesis) a solution for a specific set of parameters.

Moreover, the solution of exploiting an exoskeleton for postural training with a dynamically controlled vectorial compliance (in particular with legs moving jointly in the sagittal plane, or movements on the frontal plane, or finally emulating a step machine, as previously discussed) has proven to be particularly advantageous for rehabilitation purposes.

Finally, it is clear that numerous modifications and variants can be made to the present invention, all falling within the scope of the invention, as defined in the appended claims.

In particular, it is clear that the exoskeleton haptic device may also be used (with suitable modifications) for position control and compliance in controlling the movement of the upper limbs or other parts of the body, without requiring substantial modifications in the control system.

Indeed, the disclosed control system may be employed for a number of different exoskeleton haptic devices with different degrees of freedom. For example, a similar control design, but controlling independently the two legs and freeing the feet from the ground, may be extended for walking exercises (in this case the exoskeleton will have up to twelve degrees of freedom).

As it has been previously underlined, the secondary control loop for postural equilibrium may not be present, in all the situations in which equilibrium is not an issue during the execution of the desired rehabilitation exercises.

Moreover, the intention of movement of the patient may also be determined from other output measures; for example, it may be determined directly or indirectly based on measures of joint angles and forces exchanged between the patient and the exoskeleton frame structure.

Clearly, modifications may be made to the exoskeleton device as shown in FIG. 1. For example, the exoskeleton haptic device 1 could be of the monoleg-type, i.e. having both legs coupled to a same (one-piece) support structure. This simple arrangement may be useful to perform transitions between fixed positions, such as the sit-to-stand and stand-to sit transitions in the sagittal plane.

The invention claimed is:

1. Control system for an exoskeleton haptic device, said exoskeleton haptic device having:
   a frame structure, configured to be coupled to the body of a subject;
   actuator means, carried by said frame structure and operable to cause movement of a number of joints of said body;

first sensor means, coupled to said body and configured to detect first signals ($y_o$) indicative of an intention of movement of said subject, characterized by comprising:
- a feedback stage, configured to control a position of said joints based on a reference position ($\theta_{ref}$) and joint position and velocity measures ($\theta, \dot\theta$);
- a feedforward stage, configured to control a compliance presented by said exoskeleton haptic device to said subject based on the detected first signals ($y_o$); and
- combining means, configured to combine outputs from said feedback stage and feedforward stage in order to generate a driving signal ($u_m$) for said actuator means, thereby imposing a controlled position ($\theta$) to said joints,
  - wherein said feedforward stage includes an admittance block configured to control an admittance response of said exoskeleton haptic device in a neighbor of the reference position ($\theta_{ref}$) with respect to a subject effort ($C_O$); wherein said compliance is achieved through said admittance control; and
  - wherein said feedback stage and feedforward stage are configured to implement a primary closed loop for control of said position of said joints and of said compliance; further comprising a secondary closed loop, operatively coupled to said primary closed loop for control of postural equilibrium of said subject during said movement, and wherein said secondary closed loop is configured to generate a perturbation ($\delta\theta_{ref}$) of said reference position ($\theta_{ref}$) at input of said feedback stage such as to maintain said postural equilibrium;
- second sensor means configured to detect reaction forces imparted by the ground to said subject and a center of said reaction forces; wherein said secondary closed loop is configured to:
  - implement an inverted pendulum model of said exoskeleton haptic device;
  - estimate a position of the zero moment point (ZMP) of said body, which is the point at which a resultant of torques associated to said reaction forces is zero, and a position of the COG—center of gravity—of said body, based on signals detected by said second sensor means; and
  - determine a value of said perturbation ($\delta\theta_{ref}$), such that said ZMP position is maintained in a region of postural stability controlling said COG position; and
- an inhibitor block configured to perform a determination whether equilibrium limits have been reached, based on a determined ZMP position, and to inhibit operation of said feedforward stage based on said determination, by increasing a stiffness in an imposed admittance.

2. The control system according to claim 1, wherein said feedback stage and feedforward stage are operable to generate an elastic reaction felt by said subject in the neighbor of the reference position ($\theta_{ref}$), and to modify a stiffness and/or a viscosity of said elastic reaction to achieve a control of said compliance for rehabilitation purposes.

3. The control system according to claim 1, wherein said feedback stage and feedforward stage are operable to implement a primary closed loop according to a two degree of freedom control design, where the feedback stage guarantees position in front of external disturbances, and the feedforward stage generates a desired admittance in the compliance towards said subject; said two degree of freedom control design being solved with an H-infinite approach, whereby, measuring the subject effort ($C_O$) through said first signals ($y_o$), subject compliance is embedded inside a position control loop.

4. The control system according to claim 1, wherein said first signals ($y_o$) are bioelectrical signals, in particular EMG signals, detected from muscles of said subject involved for the movement of said joints.

5. The control system according to claim 1, wherein said secondary closed loop includes an estimator block configured to determine said estimates of the ZMP and COG positions based on an actual measurement of said controlled position ($\theta$) and said reaction forces; and a processing block configured to determine said perturbation ($\delta\theta_{ref}$) as a function of a pseudo-inverse of the Jacobian of said estimated COG position.

6. The control system according to claim 1, wherein said inhibitor block is configured to stiffen an elastic reaction felt by said subject, thereby implementing a dynamic control of said subject compliance in the neighbor of the reference position ($\theta_{ref}$).

7. The control system according to claim 5, wherein said feedback stage is configured to control said position ($\theta$) of said joints in a frontal and in a sagittal plane with respect to said subject, contemporaneously and independently to maintain equilibrium in quiet posture.

8. A control system for an exoskeleton haptic device, said exoskeleton haptic device having:
- a frame structure, configured to be coupled to the body of a subject;
- actuator means, carried by said frame structure and operable to cause movement of a number of joints of said body; and
- first sensor means, coupled to said body and configured to detect first signals ($y_o$) indicative of an intention of movement of said subject, characterized by comprising:
  - a feedback stage, configured to control a position of said joints based on a reference position ($\theta_{ref}$) and joint position and velocity measures ($\theta, \dot\theta$);
  - a feedforward stage, configured to control a compliance presented by said exoskeleton haptic device to said subject based on the detected first signals ($y_o$); and
  - combining means, configured to combine outputs from said feedback stage and feedforward stage in order to generate a driving signal ($u_m$) for said actuator means, thereby imposing a controlled position ($\theta$) to said joints, wherein said actuator means are configured to actuate ankle, knee and hip joints of said body; said feedback stage and feedforward stage being configured to implement a dynamical model of said exoskeleton haptic device composed of two independent elements: a triple inverted pendulum in the sagittal plane of said body with joined lower limbs, having three degrees of freedom for actuation by said actuator means of movements, in pairs, of said ankle, knee and hip joints; and a switched system with two configurations of a parallelogram or open quadrilateral, according to a phase of double or single stance, for actuation by said actuator means independently of the right and left of said hip joints in the frontal plane; said control being under-actuated in said frontal plane during the single stance.

9. The control system according to claim 8, wherein, along with the actuation of said hip joints in the frontal plane, knee and hip joints of a free leg are actuatable in the sagittal plane, with a partially constrained free foot, to achieve a three degree of freedom dynamics emulating a step machine.

10. The control system according to claim 1, wherein said exoskeleton haptic device is coupled to the lower limbs of said subject and said actuator means are configured to actuate ankle, knee and hip joints of said body; and wherein said feedback stage and feedforward stage are configured to control said exoskeleton haptic device for training for rehabilitation purposes, according to different postural exercises, among which one or more of the following:

sagittal plane coordination with both feet on the ground, wherein left and right ankle, knee and hip joints are activated in pairs in sit-to-stand and stand-to-sit transitions;

frontal plane coordination, with transitions from double to single stance postures, with fixed knees, by shifting the weight of the subject from one foot to the other and then lifting the free foot, activating in the frontal plane said hip joints; and intermixed sagittal and frontal plane coordination, wherein, contemporaneously to the activation of the hip joints in the frontal plane, the free foot is raised, activating knee and hip joints of the related free leg in the sagittal plane; said intermixed sagittal and frontal plane coordination providing a step machine embedding equilibrium control.

11. The control system according to claim 10, wherein said feedforward stage is operable to direct the movements of said subject according to one of said different postural exercises, by vectorially controlling said compliance.

12. The control system according to claim 10, wherein said feedforward stage is further operable during said postural exercises to implement a dynamically variable admittance response of said exoskeleton haptic device with respect to the subject effort ($C_0$) for rehabilitation purposes.

13. Exoskeleton haptic device comprising:
the frame structure;
the actuator means; and
the first sensor means;
characterized by comprising the control system according to claim 1.

14. The exoskeleton haptic device according to claim 13, configured to be coupled to the lower limbs of said subject for rehabilitation postural training and neural plasticity recovery, and operable to control movements of said lower limbs in the frontal and/or sagittal planes of said subject.

15. A computer program product comprising computer instructions for implementing, when executed in a processing unit, the control system according to claim 1; in particular, said computer program product allowing modification of biometric parameters of said subject and stiffness and viscosity parameters of said subject compliance.

* * * * *